United States Patent [19]

Maeno

[11] Patent Number: 5,719,913
[45] Date of Patent: Feb. 17, 1998

[54] PSEUDO-RANDOM NUMBER GENERATING CIRCUIT AND BIDIRECTIONAL SHIFT REGISTER

[75] Inventor: Hideshi Maeno, Tokyo, Japan

[73] Assignee: Mitsubishi Denki Kabushiki Kaisha, Tokyo, Japan

[21] Appl. No.: 686,469

[22] Filed: Jul. 25, 1996

[30] Foreign Application Priority Data

Mar. 12, 1996 [JP] Japan .................................. 8-054655

[51] Int. Cl.$^6$ ........................................................ G11C 19/00
[52] U.S. Cl. ........................... 377/54; 377/69; 377/75; 377/81
[58] Field of Search ................................. 377/54, 69, 75, 377/81

[56] References Cited

U.S. PATENT DOCUMENTS

| | | | |
|---|---|---|---|
| 5,243,303 | 9/1993 | Murata et al. | 331/78 |
| 5,268,949 | 12/1993 | Watanabe et al. | 377/33 |
| 5,383,143 | 1/1995 | Crouch et al. | 364/717 |
| 5,596,617 | 1/1997 | Wolf et al. | 377/81 |

Primary Examiner—Margaret Rose Wambach
Attorney, Agent, or Firm—Oblon, Spivak, McClelland, Maier & Neustadt, P.C.

[57] ABSTRACT

The scale of a pseudo-random number generating circuit that can select normal or reverse order in which pseudo-random numbers are generated is reduced. The outputs of first and second NOR circuits are selected by a selecting circuit and sent to a parity check circuit. The output of the parity check circuit is directly sent to the right and left shift input terminals of a bidirectional shift register.

14 Claims, 20 Drawing Sheets

F I G. 1 9
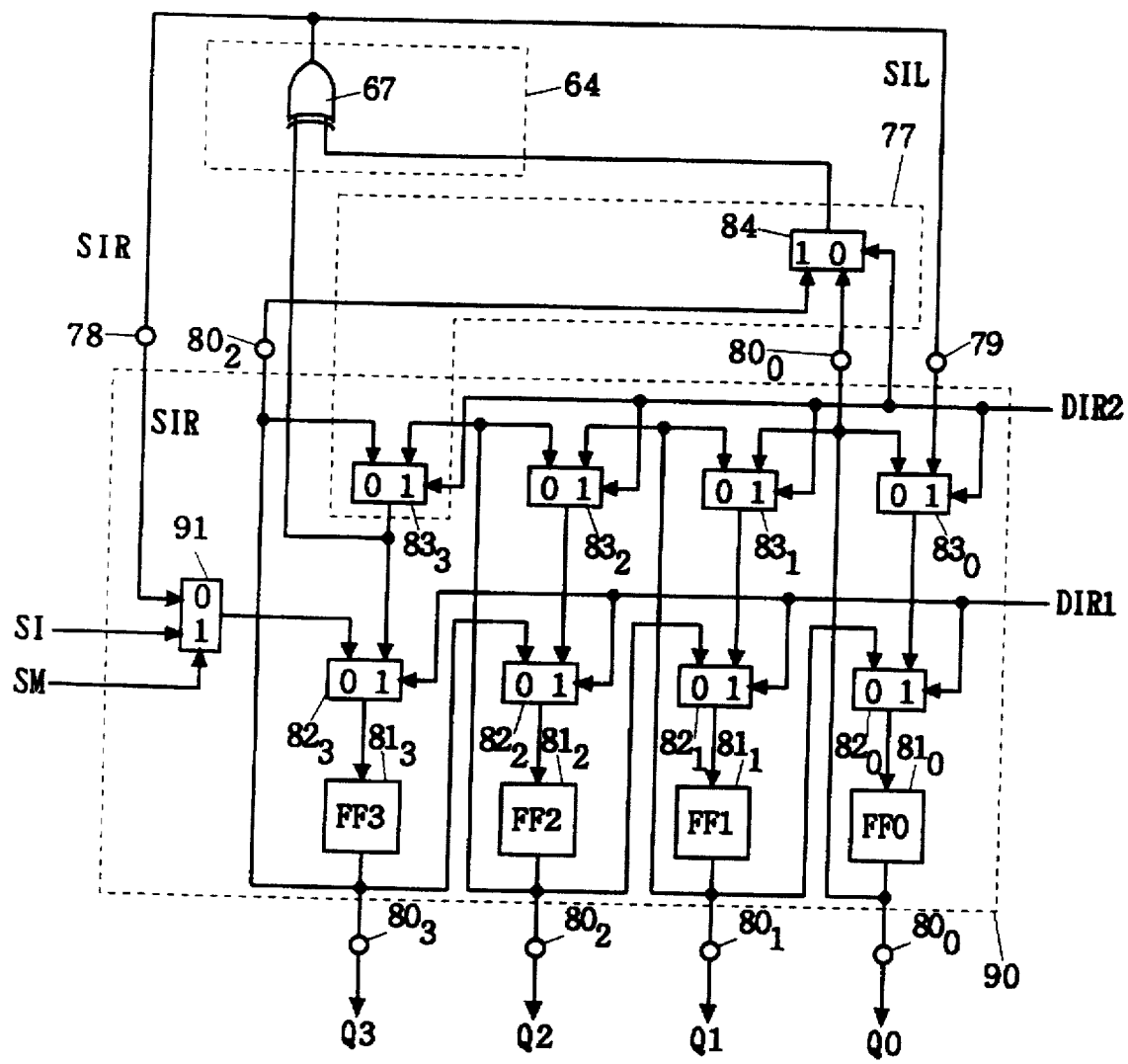

5,719,913

PSEUDO-RANDOM NUMBER GENERATING CIRCUIT AND BIDIRECTIONAL SHIFT REGISTER

BACKGROUND OF THE INVENTION

1. Field of the Invention

The present invention relates to a pseudo-random number generating circuit formed by using a linear feedback shift register, and more particularly to a pseudo-random number generating circuit which can generate two kinds of pseudo-random number sequences, that is, a predetermined pseudo-random number sequence and another pseudo-random number sequence which is obtained by arranging the first to last terms of the predetermined pseudo-random number sequence in entirely reverse order. Furthermore, the present invention relates to a bidirectional shift register used for such a pseudo-random number generating circuit or the like.

2. Description of the Background Art

FIG. 23 shows a pseudo-random number generating circuit which is similar to a pseudo-random number generating circuit according to the prior art that has been disclosed in Japanese Laid-Open Patent No. 63-204325. The pseudo-random number generating circuit shown in FIG. 23 is formed by using a 4-bit bidirectional shift register. This kind of N-bit pseudo-random number generating circuit can generate $2^N$ kinds of pseudo-random numbers including 0 in predetermined order by adding a NOR circuit thereto based on a linear feedback shift register (hereinafter referred to as a LFSR).

Furthermore, a bidirectional shift register is used for the pseudo-random number generating circuit shown in FIG. 23. The pseudo-random number generating circuit shown in FIG. 23 can generate pseudo-random numbers in predetermined first order when the bidirectional shift register is in mode where data is shifted in the first shift direction. By switching the shift mode to change the first shift direction to the second shift direction which is reverse thereto by a shift direction control signal DIR, the pseudo-random number generating circuit can generate pseudo-random number sequences in second order which is entirely reverse to the first order.

A pseudo-random number generating circuit having the above function, that is, the function of generating the pseudo-random number sequences in the first order and the second order which is reverse to the first order will be hereinafter referred to as a bidirectional pseudo-random number generating circuit.

Such a bidirectional pseudo-random number generating circuit can be used as an address generating circuit for a memory such as a RAM or a ROM, and in place of an UP/DOWN binary counter utilized for the ordinary random logic.

The bidirectional pseudo-random number generating circuit shown in FIG. 23 will be described below. In FIG. 23, the reference numeral 1 designates a bidirectional shift register which can input and output 4-bit data in series and in parallel while moving the 4-bit data right or left, the reference numeral 2 designates a selecting circuit for selectively outputting the output of the bidirectional shift register 1 and "0" on receipt thereof, the reference numeral 3 designates a parity detecting circuit for detecting that the number of "1" bits of a plurality of bits forming data output from the selecting circuit 2 is even or odd and for outputting the result of detection, the reference numeral 4 designates a first NOR circuit for performing the NOR operation of all bits which are output from all output terminals $8_1$ to $8_3$ of the bidirectional shift register 1 except for a least significant bit output terminal $8_0$ which is provided on the rightmost end of the bidirectional shift register 1, the reference numeral 5 designates a second NOR circuit for performing the NOR operation of all outputs Q2 to Q0 which are output from all output terminals $8_2$ to $8_0$ of the bidirectional shift register 1 except for a most significant bit output terminal $8_3$ which is provided on the leftmost end of the bidirectional shift register 1, the reference numeral 6 designates a first exclusive-OR circuit (hereinafter referred to as an XOR circuit) for outputting exclusive-OR of the outputs of the parity detecting circuit 3 and the first NOR circuit 4 to a right shift input terminal 9 of the bidirectional shift register 1, and the reference numeral 7 designates a second XOR circuit for outputting exclusive-OR of the outputs of the parity detecting circuit 3 and the second NOR circuit 5 to a left shift input terminal 10 of the bidirectional shift register 1.

The selecting circuit 2 comprises a selector 11 for selectively outputting "0" or an output Q3 sent from the leftmost output terminal $8_3$ of the bidirectional shift register 1 according to a shift direction control signal DIR, a selector 12 for selectively outputting the output Q2 or Q3 of the bidirectional shift register 1 according to the shift direction control signal DIR, and a selector 13 for selectively outputting the output Q0 sent from the rightmost output terminal $8_0$ of the bidirectional shift register 1 or "0" according to the shift direction control signal DIR. These selectors 11 to 13 are a kind of switch means.

The parity detecting circuit 3 comprises an XOR gate 14 having first and second input ends, and an output end for outputting the result of parity check of bits input from the first and second input ends, and an XOR gate 15 having an output end connected to the second input end of the XOR gate 14, and first and second input ends.

The first NOR circuit 4 comprises an OR gate 16 for performing the OR operation of the outputs Q1 and Q2 except for the output Q0 and Q3 corresponding to the least and most significant bits, and a NOR gate 17 for performing the NOR operation of the output of the OR gate 16 and the output Q3 of the bidirectional shift register 1.

The second NOR circuit 5 comprises the OR gate 16 and a NOR gate 18 for performing the NOR operation of the output of the OR gate 16 and the output Q0 of the bidirectional shift register 1.

A feedback circuit is formed by the selecting circuit 2, the parity detecting circuit 3, the first and second NOR circuits 4 and 5, and the first and second XOR circuits 6 and 7.

If the shift direction control signal DIR is "0", the bidirectional shift register 1 enters right shift mode. In the right shift mode, data are input from the right shift input terminal 9 of the bidirectional shift register 1 in bit serial. Each bit forming the data sequentially moves from a high order bit to a low order bit of the outputs of the bidirectional shift register 1.

If shift operation is performed when the shift direction control signal DIR is "0", the outputs (Q3, Q2, Q1, Q0) of the bidirectional shift register 1 are changed as follows: (0,0,0,0)→(1,0,0,0)→(1,1,0,0)→(1,1,1,0)→(1,1,1,1)→(0,1,1,1)→(1,0,1,1)→(0,1,0,1,)→(1,0,1,0,)→(1,1,0,1)→(0,1,1,0)→(0,0,1,1)→(1,0,0,1)→(0,1,0,0)→(0,0,1,0)→(0,0,0,1)→(0,0,0,0).

If the shift direction control signal DIR is "1", the bidirectional shift register 1 enters left shift mode. In the left shift mode, data are input from the left shift input terminal 10 of the bidirectional shift register 1 in bit serial. Each bit forming the data sequentially moves from the low order bit to the high order bit of the outputs of the bidirectional shift register 1.

If the shift operation is performed when the shift direction control signal DIR is "1", the outputs (Q3, Q2, Q1, Q0) of the bidirectional shift register 1 are changed as follows: (0,0,0,0)→(0,0,1,0)→(0,0,1,0)→(0,1,0,0)→(1,0,0,1)→(0,0, 1,1)→(0,1,1,0)→(1,1,0,1)→(1,0,1,0)→(0,1,0,1)→(1,0,1,1) →(0,1,1,1)→(1,1,1,1)→(1,1,1,0)→(1,1,0,0)→(1,0,0,0)→ (0,0,0,0).

The structure of the bidirectional shift register 1 will be described below with reference to FIG. 24. The bidirectional shift register 1 is a 4-bit shift register which is formed by four flip-flop circuits $20_0$ to $20_3$ and four selectors $21_0$ to $21_3$. The flip-flop circuits $20_0$ to $20_3$ are used as a kind of data holding means. The outputs of the flip-flop circuits $20_0$ to $20_3$ are outputs Q0 to Q3 of the bidirectional shift register 1. The selector $21_3$ outputs data SIR input from the right shift input terminal 9 in bit serial to the flip-flop circuit $20_3$ when the shift direction control signal DIR is "0", and outputs the output Q2 of the flip-flop circuit $20_2$ to the flip-flop circuit $20_3$ when the shift direction control signal DIR is "1". The selector $21_2$ outputs the output Q3 of the flip-flop circuit $20_3$ to the flip-flop circuit $20_2$ when the shift direction control signal DIR is "0", and outputs the output Q1 of the flip-flop circuit $20_1$ to the flip-flop circuit $20_2$ when the shift direction control signal DIR is "1". The selector $21_1$ outputs the output Q2 of the flip-flop circuit $20_2$ to the flip-flop circuit $20_1$ when the shift direction control signal DIR is "0", and outputs the output Q0 of the flip-flop circuit $20_0$ to the flip-flop circuit $20_1$ when the shift direction control signal DIR is "1". The selector $21_0$ outputs the output Q1 of the flip-flop circuit $20_1$ to the flip-flop circuit $20_0$ when the shift direction control signal DIR is "0", and outputs data SIL input from the left shift input terminal 10 in bit serial to the flip-flop circuit $20_0$ when the shift direction control signal DIR is "1".

The pseudo-random number generating circuit according to the prior art has the above structure. The structure of the feedback circuit is complicated. For this reason, the circuit is large in scale.

SUMMARY OF THE INVENTION

A first aspect of the present invention is directed to a pseudo-random number generating circuit comprising a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series, and a feedback circuit for feeding back data according to signals output from the N output terminals of the bidirectional shift register to the right and left shift input terminals, wherein pseudo-random number sequences in which $2^N$ kinds of data each once appear in predetermined order can be output from the N output terminals of the bidirectional shift register, and normal or reverse order can be selected as the predetermined order by switching the shift direction of the bidirectional shift register according to a shift direction control signal, the feedback circuit comprising a parity detecting circuit for checking that the number of true bits of a plurality of bits forming given data is even or odd and for directly outputting a signal according to the result of check to the right and left shift input terminals, a first NOR circuit for performing a NOR operation of data output from all output terminals of the bidirectional shift register except for the rightmost output terminal of the N output terminals of the bidirectional shift register, a second NOR circuit for performing a NOR operation of data output from all output terminals of the bidirectional shift register except for the leftmost output terminal of the N output terminals of the bidirectional shift register, and a selecting circuit for selecting first output data output from a first group of output terminals of the N output terminals of the bidirectional shift register and the first NOR circuit or second output data output from a second group of output terminals of the N output terminals and the second NOR circuit according to the shift direction control signal, and for sending selected data to the parity detecting circuit.

A second aspect of the present invention is directed to a pseudo-random number generating circuit comprising a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series, and a feedback circuit for feeding back data corresponding to signals output from the N output terminals of the bidirectional shift register to the right and left shift input terminals, wherein pseudo-random number sequences in which $2^N$ kinds of data appear each time in predetermined order can be output from the N output terminals of the bidirectional shift register, and normal or reverse order can be selected as the predetermined order by switching the shift direction of the bidirectional shift register according to a shift direction control signal, the feedback circuit comprising a parity detecting circuit for checking that the number of true bits of a plurality of bits forming given data is even or odd and for controlling a value of a signal output to the right and left shift input terminals according to a result of check, and a selecting circuit for selecting first output data including outputs sent from a first group of output terminals of the N output terminals of the bidirectional shift register or second output data including outputs sent from a second group of output terminals of the N output terminals according to the shift direction control signal, and for sending selected data to the parity detecting circuit, wherein if a shared output terminal which is shared by the first and second groups of output terminals is present, an output of the shared output terminal is caused to pass through the selecting circuit and is directly sent to the parity detecting circuit.

A third aspect of the present invention is directed to a pseudo-random number generating circuit comprising a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series, and a feedback circuit for feeding back data according to signals output from the N output terminals of the bidirectional shift register to the right and left shift input terminals, wherein pseudo-random number sequences in which $2^N$ kinds of data each once appear in predetermined order can be output from the N output terminals of the bidirectional shift register, and normal or reverse order can be selected as the predetermined order by switching the shift direction of the bidirectional shift register according to a shift direction control signal, the feedback circuit comprising a parity detecting circuit for checking that the number of true bits of a plurality of bits forming given data is even or odd and for directly outputting a signal corresponding to a result of check to the right and left shift input terminals, a first selecting circuit for selecting either of the rightmost and leftmost output terminals of the N output terminals of the bidirectional shift register according to the shift direction control signal, a NOR circuit for sending, to the parity detecting circuit, NOR of data output from all output terminals of the bidirectional shift register except for the rightmost and leftmost output terminals of the N output terminals of the bidirectional shift register and data output from the first selecting circuit, and a second selecting circuit for selecting first output data output from a first group of output terminals of the N output terminals of the bidirectional shift register or second output data output from a second group of output terminals of the N output terminals according to the shift direction control signal, and for sending selected data to the parity detecting circuit.

A fourth aspect of the present invention is directed to the pseudo-random number generating circuit according to the third aspect of the present invention, wherein the first group of output terminals of the bidirectional shift register includes the rightmost output terminal of the N output terminals, the second group of output terminals of the bidirectional shift register includes the leftmost output terminal of the N output terminals, and data sent to the parity detecting circuit is output from only the bidirectional shift register and the NOR circuit.

A fifth aspect of the present invention is directed to a pseudo-random number generating circuit comprising a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series, and a feedback circuit for feeding back data corresponding to signals output from the N output terminals of the bidirectional shift register to the right and left shift input terminals, wherein pseudo-random number sequences in which $2^N$ kinds of data each once appear in predetermined order can be output from the N output terminals of the bidirectional shift register, and normal or reverse order can be selected as the predetermined order by switching the shift direction of the bidirectional shift register according to a shift direction control signal, the feedback circuit comprising a parity detecting circuit for checking that the number of true bits of a plurality of bits forming given data is even or odd and for controlling a value of a signal output to the right and left shift input terminals according to a result of detection, and a selecting circuit for selecting first output data output from a first group of output terminals of the N output terminals of the bidirectional shift register or second output data output from a second group of output terminals of the N output terminals according to the shift direction control signal, and for sending selected data to the parity detecting circuit, wherein the first group of output terminals of the bidirectional shift register includes the rightmost output terminal of the N output terminals, the second group of output terminals of the bidirectional shift register includes the leftmost output terminal of the N output terminals, and data sent to the parity detecting circuit is output from only the bidirectional shift register.

A sixth aspect of the present invention is directed to the pseudo-random number generating circuit according to the fifth aspect of the present invention, further comprising a first exclusive-OR circuit having an output terminal connected to the right shift input terminal, and first and second input terminals, a second exclusive-OR circuit having an output terminal connected to the left shift input terminal, and first and second input terminals, a first NOR circuit for outputting NOR of data output from all output terminals of the bidirectional shift register except for the rightmost output terminal of the N output terminals of the bidirectional shift register to the first input terminal of the first exclusive-OR circuit, and a second NOR circuit for outputting NOR of data output from all output terminals of the bidirectional shift register except for the leftmost output terminal of the N output terminals of the bidirectional shift register to the first input terminal of the second exclusive-OR circuit, wherein the parity detecting circuit directly outputs a signal based on a result of check to the second input terminals of the first and second exclusive-OR circuits.

A seventh aspect of the present invention is directed to a pseudo-random number generating circuit comprising a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series, and a feedback circuit for feeding back data corresponding to signals output from the N output terminals of the bidirectional shift register to the right and left shift input terminals, wherein pseudo-random number sequences in which pseudo-random numbers appear in predetermined order can be output from the N output terminals of the bidirectional shift register, and normal or reverse order can be selected as the predetermined order by switching the shift direction of the bidirectional shift register according to a shift direction control signal, the feedback circuit comprising a parity detecting circuit for detecting that the number of true bits of a plurality of bits forming given data is even or odd and for controlling a value of a signal output to the right and left shift input terminals according to a result of detection, and a selecting circuit for selecting first output data output from a first group of output terminals of the N output terminals of the bidirectional shift register or second output data output from a second group of output terminals of the N output terminals according to the shift direction control signal, and for sending selected data to the parity detecting circuit, wherein the first group of output terminals of the bidirectional shift register includes the rightmost output terminal of the N output terminals, the second group of output terminals of the bidirectional shift register includes the leftmost output terminal of the N output terminals, and data sent to the parity detecting circuit is output from only the bidirectional shift register, and wherein the parity detecting circuit directly outputs a signal based on the result of check to the right and left shift input terminals.

An eighth aspect of the present invention is directed to a pseudo-random number generating circuit comprising a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series, and a feedback circuit for feeding back data according to signals output from the N output terminals of the bidirectional shift register to the right and left shift input terminals, wherein pseudo-random number sequences in which $2^N$ kinds of data each once appear in predetermined order can be output from the N output terminals of the bidirectional shift register, and normal or reverse order can be selected as the predetermined order by switching the shift direction of the bidirectional shift register according to a shift direction control signal, and wherein the feedback circuit and the bidirectional shift register include a common selector for selecting at least two outputs of the N output terminals.

A ninth aspect of the present invention is directed to a bidirectional shift register comprising right and left shift input terminals for inputting data in series while shifting data right or left, and a plurality of output terminals for outputting input data in parallel, the bidirectional shift register having a data holding function for holding the input data without shift, further comprising path switching means for changing a connection between internal paths in order to switch right shift mode, left shift mode and data holding mode, wherein the path switching means includes at least one adjacent output switching means for switching data output from adjacent output terminals of the plurality of output terminals.

A tenth aspect of the present invention is directed to the bidirectional shift register according to the ninth aspect of the present invention, further comprising at least one data holding means for outputting data to either of the adjacent output terminals which are switched by the at least one adjacent output switching means, the path switching means further comprising at least one intermediate switch means provided between the at least one data holding means and the at least one adjacent output switching means for selectively outputting, to the at least one data holding means, either of data output from a predetermined output terminal of the plurality of output terminals other than the adjacent output terminals which are switched by the at least one adjacent output switching means and data output from the at least one adjacent output switching means.

An eleventh aspect of the present invention is directed to the bidirectional shift register according to the tenth aspect of the present invention, wherein the at least one adjacent output switching means includes first to third adjacent output switching means, the at least one data holding means includes first to third data holding means provided corresponding to the first to third adjacent output switching means respectively, the at least one intermediate switch means includes first to third intermediate switch means provided corresponding to the first to third data holding means respectively, the first intermediate switch means selectively outputs right shift data to be shifted right or the output data of the first adjacent output switching means to the first data holding means according to a first direction signal, the first adjacent output switching means selectively outputs output data of the first data holding means or output data of the second data holding means according to a second direction signal, the second intermediate switch means selectively outputs output data of the first data holding means or output data of the second adjacent output switching means to the second data holding means according to the first direction signal, the second adjacent output switching means selectively outputs output data of the second data holding means or output data of the third data holding means according to the second direction signal, the third intermediate switch means selectively outputs output data of the second data holding means or output data of the third adjacent output switching means to the third data holding means according to the first direction signal, and the third adjacent output switching means selectively outputs output data of the third data holding means or left shift data to be shifted left according to the second direction signal.

A twelfth aspect of the present invention is directed to the bidirectional shift register according to the ninth aspect of the present invention, further comprising canceling means for performing nullification in such a manner that data received at the right or left shift input terminal is not transmitted through the internal path, and transmitting means for transmitting scan data into the internal path.

A thirteenth aspect of the present invention is directed to the bidirectional shift register according to the twelfth aspect of the present invention, wherein either of the adjacent output terminals switched by the at least one adjacent output switching means includes the most end output terminal of the plurality of output terminals, further comprising at least one data holding means for outputting data to the most end output terminal, the path switching means comprising at least one intermediate switch means provided between the at least one data holding means and the at least one adjacent output switching means for selectively outputting data output switching means for selectively outputting data received by the right or left shift input terminal which is closer to the most end output terminal, or output data of the at least one adjacent output switching means, and scan switch means, which functions as the canceling means and the transmitting means, provided between the intermediate switch means and the at least one data holding means for selectively outputting scan data or the output data of the at least one intermediate switch means according to a scan control signal.

A fourteenth aspect of the present invention is directed to the bidirectional shift register according to the twelfth aspect of the present invention, wherein the scan switch means which functions as the canceling means and the transmitting means is provided immediately after the right or left shift input terminal.

According to the first aspect of the present invention, the selecting circuit of the feedback circuit selects the first output data output from the first group of output terminals of the N output terminals of the bidirectional shift register and the first NOR circuit or the second output data output from the second group of output terminals of the N output terminals and the second NOR circuit according to the shift direction control signal, and sends the selected data to the parity detecting circuit. The parity detecting circuit receives the selected data to directly output a signal corresponding to the result of detection to the right and left shift input terminals. Consequently, an exclusive-OR circuit for performing the exclusive-OR operation of the outputs of the parity detecting circuit and the first NOR circuit and an exclusive-OR circuit for performing the exclusive-OR operation of the outputs of the parity detecting circuit and the second NOR circuit, which are required in the prior art, can be omitted. Thus, the scale of the circuit can be reduced more than in the prior art.

According to the second aspect of the present invention, if there is the output terminal common to the first and second groups of output terminals which must be selected by the selecting circuit according to the shift direction control signal, the output sent from the common output terminal is caused to pass through the selecting circuit and is directly output to the parity detecting circuit. Consequently, the structure of the selecting circuit can be simplified, for example, the number of the selectors can be reduced. Thus, the scale of the circuit can be reduced more than in the prior art.

According to the third aspect of the present invention, the output of the rightmost or leftmost output terminal of the bidirectional shift register which is selected by the first selecting circuit is sent to the NOR circuit. Consequently, an exclusive-OR circuit for performing the exclusive-OR operation of the outputs of the parity detecting circuit and the first NOR circuit and an exclusive-OR circuit for performing the exclusive-OR operation of the outputs of the parity detecting circuit and the second NOR circuit, which are required in the prior art, can be united. Thus, the scale of the circuit can be reduced more than in the prior art.

According to the fourth aspect of the present invention, the data sent to the parity detecting circuit are only the outputs of the bidirectional shift register and the NOR circuit. Consequently, "0" is not selected by the selecting circuit unlike the prior art. Thus, the structure of the selecting circuit can be simplified. As a result, the scale of the circuit can be reduced still more.

According to the fifth aspect of the present invention, the data sent to the parity detecting circuit is only the output of the bidirectional shift register. Consequently, "0" is not selected by the selecting circuit unlike the prior art. Thus, the structures of the selecting circuit and the parity detecting circuit can be simplified. As a result, the scale of the circuit can be reduced still more.

According to the sixth aspect of the present invention, the exclusive-OR of the output of the first NOR circuit and that of the parity detecting circuit is output to the right shift input terminal by the first exclusive-OR circuit, and the exclusive-OR of the output of the second NOR circuit and that of the parity detecting circuit is output to the left shift input terminal by the second exclusive-OR circuit. Consequently, it is possible to obtain a pseudo-random number generating circuit having a small scale which can generate the pseudo-random numbers having all outputs of "0".

According to the seventh aspect of the present invention, the data sent to the parity detecting circuit is only the output of the bidirectional shift register. Consequently, "0" is not input to the selecting circuit unlike the prior art. Thus, the structures of the selecting circuit and the parity detecting circuit can be simplified. As a result, the scale of the circuit can be reduced still more. The output terminal of the parity detecting circuit for outputting the result of detection obtained by the parity detecting circuit is directly connected to the right and left shift input terminals. Consequently, the pseudo-random numbers having all outputs of "0" cannot be generated but the scale of the pseudo-random number generating circuit in which the structure of the feedback circuit is simplified can be reduced.

According to the eighth aspect of the present invention, the selector is shared by the feedback circuit and the bidirectional shift register. Consequently, the structure of the selecting circuit can be simplified, for example, the number of the selectors can be reduced. As a result, the scale of the circuit can be reduced more than in the prior art.

According to the ninth aspect of the present invention, the path switching means includes the adjacent output switching means for switching data output from the adjacent output terminals. Consequently, it is possible to omit the selector for switching the adjacent output terminals of the bidirectional shift register which is used in the pseudo-random number generating circuit or the like. Thus, the bidirectional shift register which reduces the scale of the circuit easily can be obtained.

According to the tenth aspect of the present invention, the intermediate switch means selectively outputs the output data of the at least one adjacent output switching means to the at least one data holding means. Consequently, the data holding function of the bidirectional shift register in which the adjacent output switching means is provided can be implemented by a simpler structure.

According to the eleventh aspect of the present invention, the left shift operation can be performed by the first to third adjacent output switching means and the right shift operation can be performed by the first to third intermediate switch means. Consequently, the bidirectional shift function can be implemented by a simpler structure.

According to the twelfth aspect of the present invention, the data input from the right or left shift input terminal is nullified by the canceling means and the scan data is transmitted into the internal path by the transmitting means. Consequently, a scan test can be performed.

According to the thirteenth aspect of the present invention, the scan switch means can selectively output the scan data and the output data of the at least one intermediate switch means according to the scan control signal, and functions as the canceling means and the transmitting means. Consequently, the structure is slightly altered, i.e., the scan switch means is added so that the scan test can be performed.

According to the fourteenth aspect of the present invention, the scan switch means which functions as the canceling means and the transmitting means is provided immediately after the right or left shift input terminal. Consequently, the structure is slightly altered, i.e., the scan switch means is added so that the scan test can be performed.

In order to solve the above problems, it is an object of the present invention to improve a feedback circuit so as to reduce the scale of a bidirectional pseudo-random number generating circuit.

It is another object of the present invention to improve a bidirectional shift register forming the bidirectional pseudo-random number generating circuit so as to simplify the structure of the feedback circuit and reduce the scale of the bidirectional pseudo-random number generating circuit.

These and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a block diagram showing the structure of a bidirectional pseudo-random number generating circuit according to a ninth embodiment of the present invention.

DESCRIPTION OF THE PREFERRED EMBODIMENTS

<First Preferred embodiment>

A bidirectional pseudo-random number generating circuit according to a first preferred embodiment of the present invention will be described below with reference to the drawings.

Figure 1:
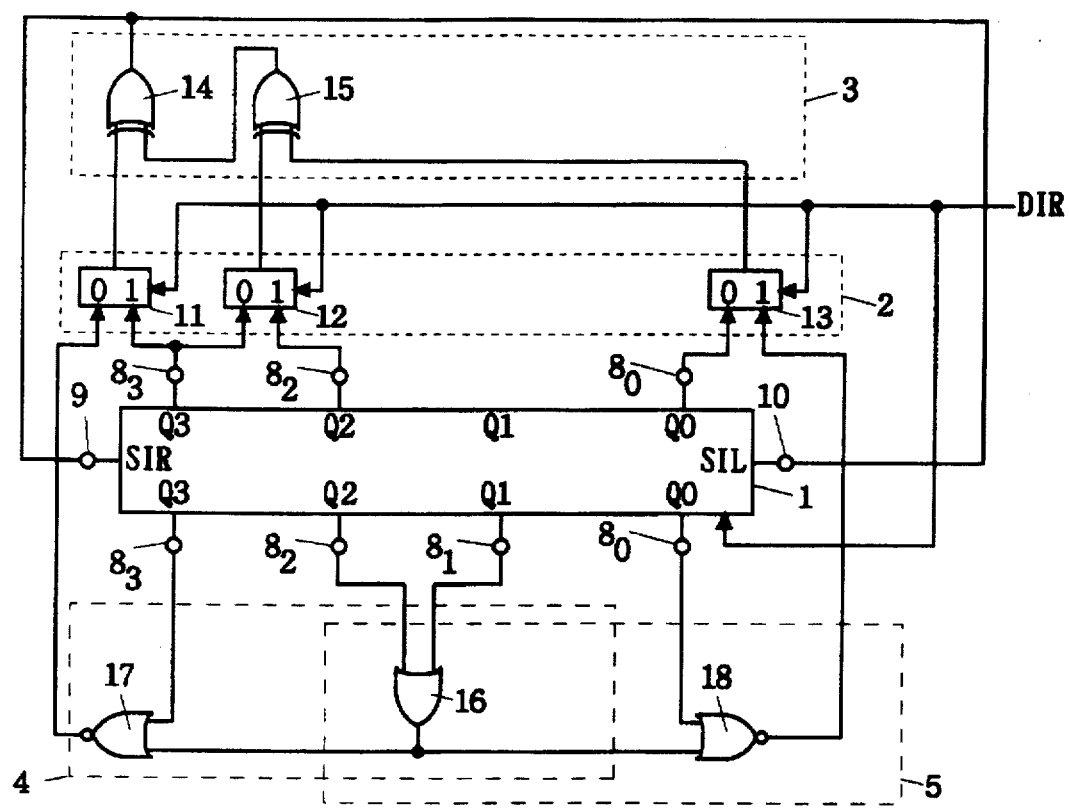
FIG. 1 is a block diagram showing the structure of a bidirectional pseudo-random number generating circuit according to a first mode of a first embodiment of the present invention.

FIG. 1 is a block diagram showing the structure of a 4-bit bidirectional pseudo-random number generating circuit according to a first mode of the first preferred embodiment of the present invention. In FIG. 1, the reference numeral 1 designates a bidirectional shift register, which is the same as that of FIG. 23, that can input and output 4-bit data in series and in parallel while moving the 4-bit data right or left, the reference numeral 4 designates a first NOR circuit for performing the NOR operation of all outputs Q1 to Q3 which are sent from all output terminals $8_1$ to $8_3$ of the bidirectional shift register 1 except for a least significant bit output terminal $8_0$ which is provided on the rightmost end of the bidirectional shift register 1, the reference numeral 5 designates a second NOR circuit for performing the NOR operation of all outputs Q2 to Q0 which are sent from all output terminals $8_2$ to $8_0$ of the bidirectional shift register 1 except for a most significant bit output terminal $8_3$ which is provided on the leftmost end of the bidirectional shift register 1, the reference numeral 2 designates a selecting circuit for inputting the outputs Q0, Q2 and Q3 of the bidirectional shift register 1 and the outputs of the first and second NOR circuits 4 and 5 and for selectively outputting them according to a shift direction control signal DIR, and the reference numeral 3 designates a parity detecting circuit for detecting that the number of "1" bits of a plurality of bits forming data output from the selecting circuit 2 is even or odd, and for directly outputting the result of detection to right and left shift input terminals 9 and 10 of the bidirectional shift register 1.

The selecting circuit 2 comprises a selector 11 for selectively outputting the output of the first NOR circuit 4 or the output Q3 sent from the leftmost output terminal $8_3$ of the bidirectional shift register 1 according to the shift direction control signal DIR, a selector 12 for selectively outputting the output Q2 or Q3 of the bidirectional shift register 1 according to the shift direction control signal DIR, and a selector 13 for selectively outputting the output Q0 sent from the rightmost output terminal $8_0$ of the bidirectional shift register 1 or the output of the second NOR circuit 5 according to the shift direction control signal DIR. These selectors 11 to 13 are a kind of switch means.

The parity detecting circuit 3 comprises an XOR gate 14 having first and second input ends, and an output end for outputting exclusive-OR of data input from the first and second input ends, and an XOR gate 15 having an output end connected to the second input end of the XOR gate 14, and first and second input ends. The output of the selector 11 is sent to the first input end of the XOR gate 14. The output of the selector 12 is sent to the first input end of the XOR gate 15. The output of the selector 13 is sent to the second input end of the XOR gate 15.

The first NOR circuit 4 comprises an OR gate 16 for performing the OR operation of the outputs Q1 and Q2 except for the outputs Q0 and Q3 according to the least and most significant bits, and a NOR gate 17 for performing the NOR operation of the output of the OR gate 16 and the output Q3 of the bidirectional shift register 1. The output of the first NOR circuit 4 is the output of the NOR gate 17.

The second NOR circuit 5 comprises the OR gate 16 and a NOR gate 18 for performing the NOR operation of the output of the OR gate 16 and the output Q0 of the bidirectional shift register 1. The output of the second NOR circuit 5 is the output of the NOR gate 18.

A feedback circuit is formed by the selecting circuit 2, the parity detecting circuit 3, and the first and second NOR circuits 4 and 5.

Figure 23:
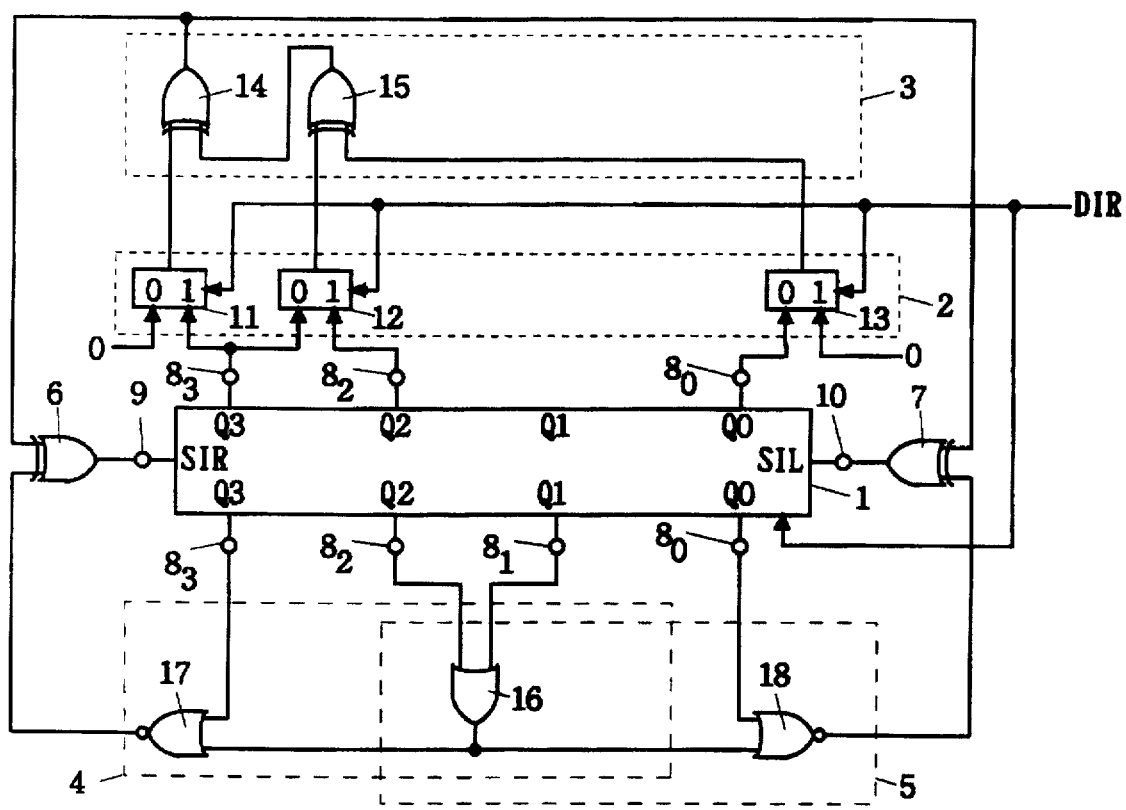
FIG. 23 is a block diagram showing the structure of a bidirectional pseudo-random number generating circuit according to the prior art.

As compared with the pseudo-random number generating circuit according to the prior art shown in FIG. 23, it is apparent that the structure of the feedback circuit is more simplified because the first and second XOR circuits 6 and 7 are omitted.

The reasons are as follows. When the shift direction control signal DIR is "0", the first input end of the XOR gate 14 receives the output of the first NOR circuit 4 in place of "0". When the shift direction control signal DIR is "1"., the second input end of the XOR gate 15 receives the output of the second NOR circuit 5 in place of "0". In other words, the selecting circuit 2 selects the outputs Q3 and Q0 sent from a first group of output terminals $8_3$ and $8_0$ of the bidirectional shift register 1 and the output of the first XOR circuit 6, or the outputs Q3 and Q2 sent from a second group of output terminals $8_3$ and $8_2$ of the bidirectional shift register 1 and the output of the second XOR circuit 7 according to the shift direction control signal DIR, and outputs them to the parity detecting circuit 3.

Pseudo-random number sequences output from the bidirectional pseudo-random number generating circuit shown in FIG. 1 are the same as those output from the bidirectional pseudo-random number generating circuit according to the prior art shown in FIG. 23.

Figure 2:
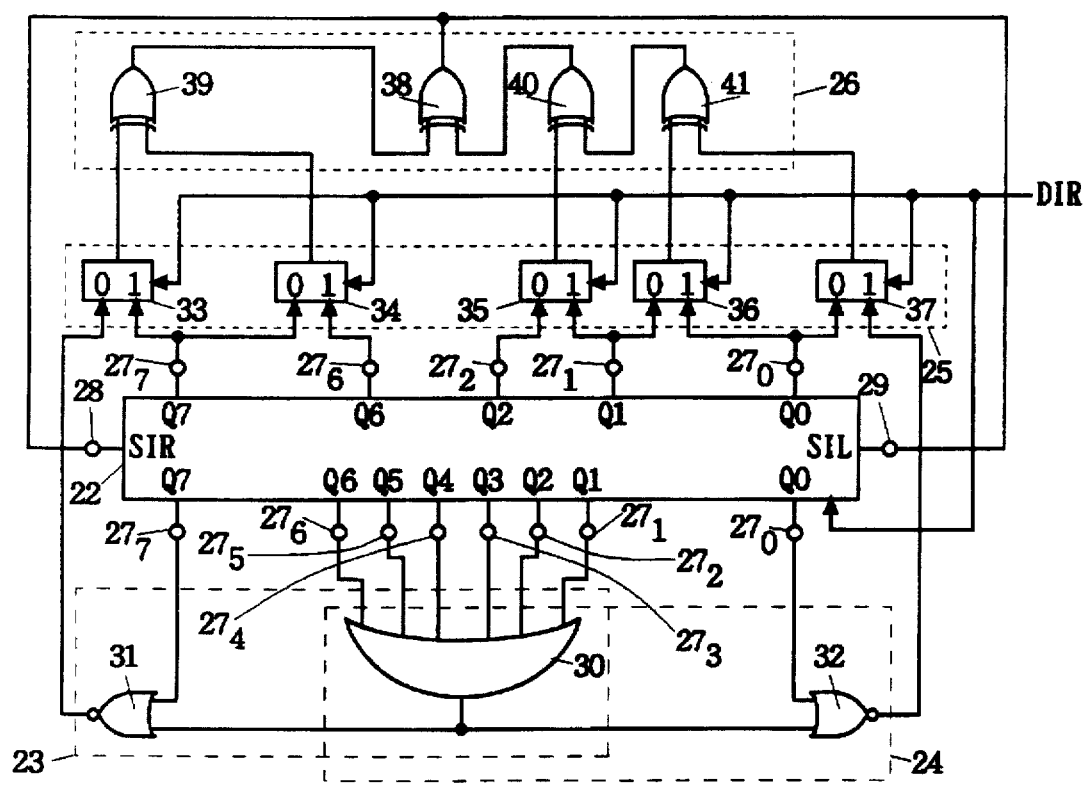
FIG. 2 is a block diagram showing the structure of a bidirectional pseudo-random number generating circuit according to a second mode of the first embodiment of the present invention.

FIG. 2 is a block diagram showing the structure of an 8-bit bidirectional pseudo-random number generating circuit according to a second mode of the first preferred embodiment of the present invention, which is designed based on the same concept as in FIG. 1. The bidirectional pseudo-random number generating circuit shown in FIG. 2 can generate $2^8$ kinds of pseudo-random numbers.

In FIG. 2, the reference numeral 22 designates a bidirectional shift register which can input and output 8-bit data in series and in parallel while moving the 8-bit data right or left, the reference numeral 23 designates a first NOR circuit for performing the NOR operation of all outputs Q1 to Q7 which are sent from all output terminals $27_1$ to $27_7$ of the bidirectional shift register 22 except for a least significant bit output terminal $27_0$ which is provided on the rightmost end of the bidirectional shift register 22, the reference numeral 24 designates a second NOR circuit for performing the NOR operation of all outputs Q6 to Q0 which are sent from all output terminals $27_6$ to $27_0$ of the bidirectional shift register 22 except for a most significant bit output terminal $27_7$ which is provided on the leftmost end of the bidirectional shift register 22, the reference numeral 25 designates a selecting circuit for inputting the outputs Q0 to Q2, Q6 and Q7 of the bidirectional shift register 22 and the outputs of the first and second NOR circuits 23 and 24 and for selectively outputting them according to a shift direction control signal DIR, and the reference numeral 26 designates a parity detecting circuit for detecting that the number of "1" bits of a plurality of bits forming data output from selecting circuit 25 is even or odd, and for directly outputting the result of detection to right and left shift input terminals 28 and 29 of the bidirectional shift register 22.

The first NOR circuit 23 comprises an OR gate 30 for performing the OR operation of the outputs Q1 to Q6 except for the outputs Q0 and Q7 corresponding to the least and most significant bits of the bidirectional shift register 22, and a NOR gate 31 for performing the NOR operation of the output of the OR gate 30 and the output Q7 of the bidirectional shift register 22. The output of the first NOR circuit 23 is the output of the NOR gate 31.

The second NOR circuit 24 comprises the OR gate 30 and a NOR gate 32 for performing the NOR operation of the output of the OR gate 30 and the output Q0 of the bidirectional shift register 22. The output of the second NOR circuit 24 is the output of the NOR gate 32.

The selecting circuit 25 comprises a selector 33 for selectively outputting the output of the first NOR circuit 23 or the output Q7 sent from the leftmost output terminal $27_7$ of the bidirectional shift register 22 according to the shift direction control signal DIR, a selector 34 for selectively outputting the output Q6 or Q7 of the bidirectional shift register 22 according to the shift direction control signal DIR, a selector 35 for selectively outputting the output Q2 or Q1 of the bidirectional shift register 22 according to the shift direction control signal DIR, a selector 36 for selectively outputting the output Q1 or Q0 of the bidirectional shift register 22 according to the shift direction control signal DIR, and a selector 37 for selectively outputting the output Q0 sent from the rightmost output terminal $27_0$ of the bidirectional shift register 22 or the output of the second NOR circuit 24 according to the shift direction control signal DIR. These selectors 33 to 37 are a kind of switch means.

The parity detecting circuit 26 comprises an XOR gate 38 having first and second input ends, and an output end for outputting exclusive-OR of data input from the first and second input ends, an XOR gate 39 having an output end connected to the first input end of the XOR gate 38, and first and second input ends, an XOR gate 40 having an output end connected to the second input end of the XOR gate 38, and first and second input ends, and an XOR gate 41 having first and second input ends and an output end connected to the second input end of the XOR gate 40. The output of the selector 33 is sent to the first input end of the XOR gate 39. The output of the selector 34 is sent to the second input end of the XOR gate 39. The output of the selector 35 is sent to the first input end of the XOR gate 40. The output of the selector 36 is sent to the first input end of the XOR gate 41. The output of the selector 37 is sent to the second input end of the XOR gate 41.

A feedback circuit is formed by the first and second NOR circuits 23 and 24, the selecting circuit 25, and the parity detecting circuit 26.

As compared with the pseudo-random number generating circuit according to the prior art, the structure of the feedback circuit is more simplified because the first and second XOR circuits which are connected to the right and left shift input terminals 28 and 29 of the bidirectional shift register 22 are omitted.

The reasons are as follows. When the shift direction control signal DIR is "0", "0" is not sent to the first input end of the XOR gate 39 but the output of the first NOR circuit 23 is sent to the parity detecting circuit 26 unlike the prior art. When the shift direction control signal DIR is "1", the second input end of the XOR gate 41 receives the output of the second NOR circuit 24 in place of "0" unlike the prior art. In other words, the selecting circuit 25 selects the outputs Q7 and Q2 to Q0 sent from a first group of output terminals $27_7$, $27_2$, $27_1$ and $27_0$ of the bidirectional shift register 22 and the output of the first XOR circuit 23, or the outputs Q7, Q6, Q1 and Q0 sent from a second group of output terminals $27_7$, $27_6$, $27_1$ and $27_0$ of the bidirectional shift register 22 and the output of the second XOR circuit 24 according to the shift direction control signal DIR, and outputs them to the parity detecting circuit 26.

Figure 3:
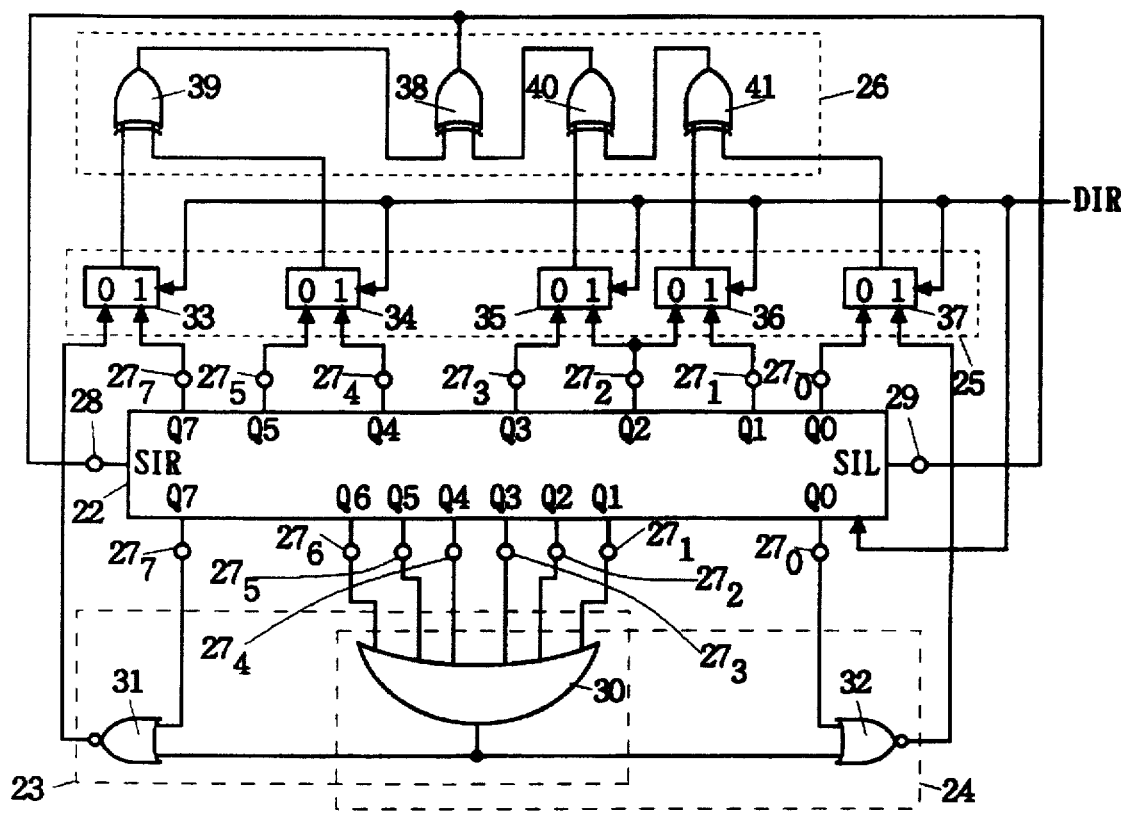
FIG. 3 is a block diagram showing the structure of a bidirectional pseudo-random number generating circuit according to a third mode of the first embodiment of the present invention.

FIG. 3 is a block diagram showing the structure of an 8-bit bidirectional pseudo-random number generating circuit according to a third mode of the first preferred embodiment of the present invention, which is designed based on the same concept as that of the bidirectional pseudo-random number generating circuit shown in FIG. 1. The bidirectional pseudo-random number generating circuit shown in FIG. 3 can generate $2^8$ kinds of pseudo-random numbers in different order from that of FIG. 2.

The bidirectional pseudo-random number generating circuit of FIG. 3 differs from that of FIG. 2 in that first and second groups of output terminals of a bidirectional shift register 22 selected by a selecting circuit 25 are different from each other. In other words, the selecting circuit 25 of the bidirectional pseudo-random number generating circuit shown in FIG. 3 selects the output of a first NOR circuit 23 and output terminals $27_5$, $27_3$, $27_2$ and $27_0$ of the bidirectional shift register 22 as the first group of output terminals when a shift direction control signal DIR is "0". Furthermore, the selecting circuit 25 of the bidirectional pseudo-random number generating circuit shown in FIG. 3 selects the output of a second NOR circuit 24 and output terminals $27_7$, $27_4$, $27_2$ and $27_1$ of the bidirectional shift register 22 as the second group of output terminals when the shift direction control signal DIR is "1".

The bidirectional pseudo-random number generating circuit shown in FIG. 3 produces the same effects as those of the bidirectional pseudo-random number generating circuit shown in FIG. 2.

<Second Preferred embodiment>

A bidirectional pseudo-random number generating circuit according to a second preferred embodiment of the present invention will be described below with reference to the drawings.

Figure 4:
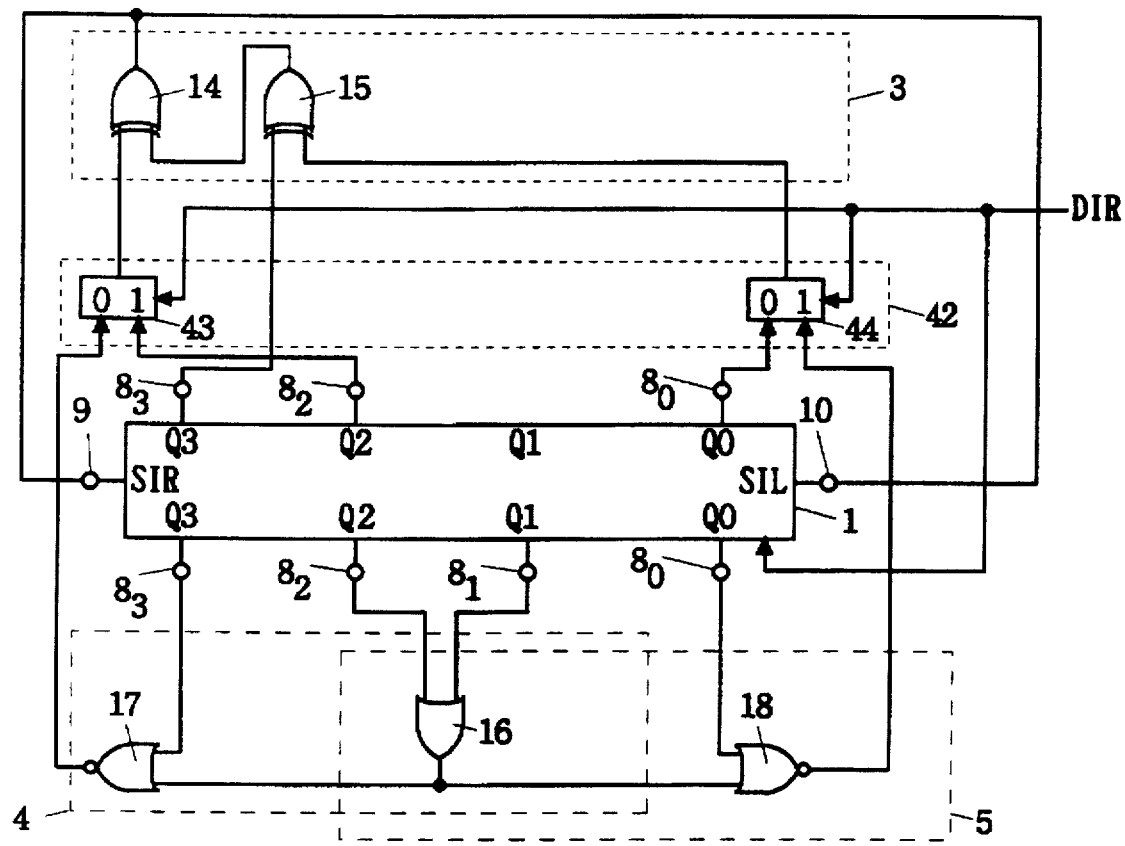
FIG. 4 is a block diagram showing the structure of a bidirectional pseudo-random number generating circuit according to a first mode of a second embodiment of the present invention.

FIG. 4 is a block diagram showing the structure of a 4-bit bidirectional pseudo-random number generating circuit according to a first mode of the second preferred embodiment of the present invention. In FIG. 4, the reference numeral 42 designates a selecting circuit for inputting and selectively outputting outputs Q0 and Q2 of a bidirectional shift register 1 and the outputs of first and second NOR circuits 4 and 5, and same reference numerals designate the same portions as in FIG. 1.

The selecting circuit 42 comprises a selector 43 for selectively outputting the output of the first NOR circuit 4 or the output Q2 sent from an output terminal $8_2$ of the bidirectional shift register 1 to the first input end of an XOR gate 14 according to a shift direction control signal DIR, and a selector 44 for selectively outputting the output Q0 sent from a rightmost output terminal $8_0$ of the bidirectional shift register 1 or the output of the second NOR circuit 5 to the second input end of an XOR gate 15 according to the shift direction control signal DIR. These selectors 43 and 44 are a kind of switch means. A leftmost output terminal $8_3$ of the bidirectional shift register 1 is directly connected to the first input end of the XOR gate 15.

The bidirectional pseudo-random number generating circuit of FIG. 4 differs from that of FIG. 1 in that an output Q3 sent from the output terminal $8_3$ which is shared by the first and second groups of output terminals of the selecting circuit 2 shown in FIG. 1 is caused to pass through the selecting circuit 42 without selection.

The structure of the selecting circuit 42 is simpler than that of the selecting circuit 2. Consequently, the structure of the feedback circuit of the bidirectional pseudo-random number generating circuit shown in FIG. 4 is so simplified that the scale of the whole bidirectional pseudo-random number generating circuit can be reduced. Pseudo-random number sequences output from the bidirectional pseudo-random number generating circuit shown in FIG. 4 are the same as those output from the bidirectional pseudo-random number generating circuit shown in FIG. 1.

Figure 5:
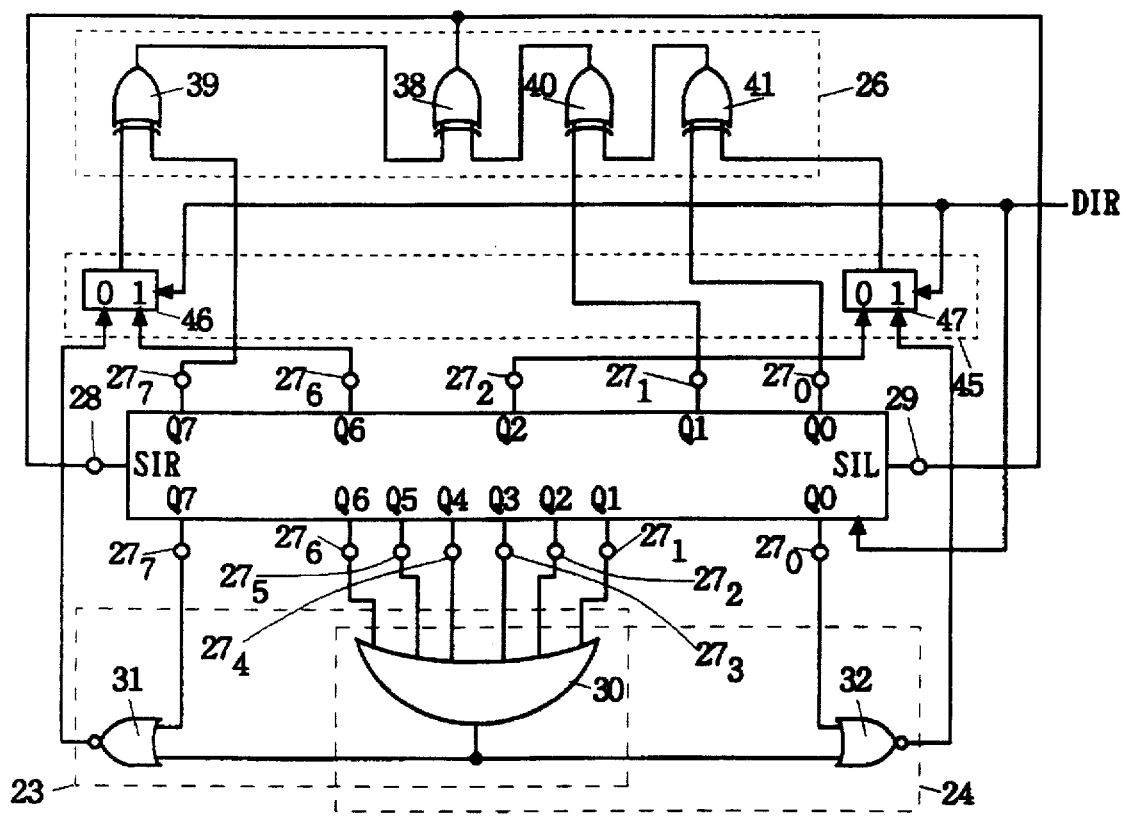
FIG. 5 is a block diagram showing the structure of a bidirectional pseudo-random number generating circuit according to a second mode of the second embodiment of the present invention.

FIG. 5 is a block diagram showing the structure of a bidirectional pseudo-random number generating circuit according to a second mode of the second preferred embodiment of the present invention. In FIG. 5, the reference numeral 45 designates a selecting circuit for inputting and selectively outputting outputs Q2 and Q6 of a bidirectional shift register 22 and the outputs of first and second NOR circuits 23 and 24, and the same reference numerals designate the same portions as in FIG. 2.

The selecting circuit 45 comprises a selector 46 for selectively outputting the output of the first NOR circuit 23 or the output Q6 sent from an output terminal $27_6$ of the bidirectional shift register 22 to the first input end of an XOR gate 39 according to a shift direction control signal DIR, and a selector 47 for selectively outputting the output Q2 sent from an output terminal $27_2$ of the bidirectional shift register 22 or the output of the second NOR circuit 24 to the second input end of an XOR gate 41 according to the shift direction control signal DIR. These selectors 46 and 47 are a kind of switch means. A leftmost output terminal $27_7$ of the bidirectional shift register 22 is directly connected to the second input end of the XOR gate 39. An output terminal $27_1$ of the bidirectional shift register 22 is directly connected to the first input end of an XOR gate 40. An output terminal $27_0$ of the bidirectional shift register 22 is directly connected to the first input end of the XOR gate 41.

The bidirectional pseudo-random number generating circuit of FIG. 5 differs from that of FIG. 2 in that outputs Q7, Q1 and Q0 sent from the output terminals $27_7$, $27_1$ and $27_0$ which are shared by first and second groups of output terminals of the selecting circuit 25 shown in FIG. 2 are caused to pass through the selecting circuit 45 without selection.

The structure of the selecting circuit 45 is simpler than that of the selecting circuit 25 shown in FIG. 2. Consequently, the structure of the feedback circuit of the bidirectional pseudo-random number generating circuit shown in FIG. 5 is so simplified that the scale of the whole bidirectional pseudo-random number generating circuit can be reduced. Pseudo-random number sequences output from the bidirectional pseudo-random number generating circuit shown in FIG. 5 are the same as those output from the bidirectional pseudo-random number generating circuit shown in FIG. 2.

Figure 6:
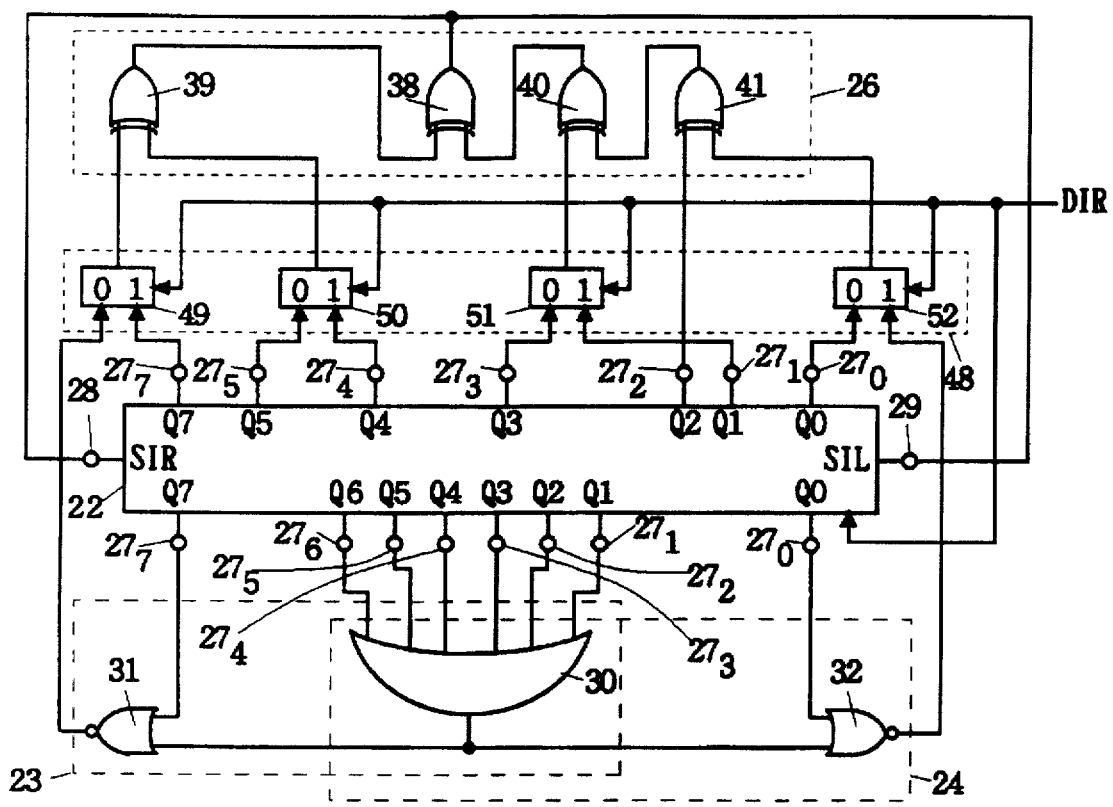
FIG. 6 is a block diagram showing the structure of a bidirectional pseudo-random number generating circuit according to a third mode of the second embodiment of the present invention.

FIG. 6 is a block diagram showing the structure of a bidirectional pseudo-random number generating circuit according to a third mode of the second preferred embodiment of the present invention. In FIG. 6, the reference numeral 48 designates a selecting circuit for inputting and selectively outputting outputs Q0, Q1, Q3 to Q5 and Q7 of a bidirectional shift register 22 and the outputs of first and second NOR circuits 23 and 24, and the same reference numerals designate the same portions as in FIG. 3.

The selecting circuit 48 comprises a selector 49 for selectively outputting the output of the first NOR circuit 23 or the output Q7 sent from an output terminal $27_7$ of the bidirectional shift register 22 to the first input end of an XOR gate 39 according to a shift direction control signal DIR, a selector 50 for selectively outputting the output Q5 sent from an output terminal $27_5$ of the bidirectional shift register 22 or the output Q4 sent from an output terminal $27_4$ of the bidirectional shift register 22 to the second input end of the XOR gate 39 according to the shift direction control signal DIR, a selector 51 for selectively outputting the output Q3 sent from an output terminal $27_3$ of the bidirectional shift register 22 or the output Q1 sent from an output terminal $27_1$ of the bidirectional shift register 22 to the first input end of an XOR gate 40 according to the shift direction control signal DIR, and a selector 52 for selectively outputting the output Q0 sent from an output terminal $27_0$ of the bidirectional shift register 22 or the output of the second NOR circuit 24 to the second input end of an XOR gate 41 according to the shift direction control signal DIR. These selectors 49 to 52 are a kind of switch means. An output terminal $27_2$ of the bidirectional shift register 22 is directly connected to the first input end of the XOR gate 41.

The bidirectional pseudo-random number generating circuit of FIG. 6 differs from that of FIG. 3 in that the output Q2 sent from the output terminal $27_2$ which is shared by first and second groups of output terminals of the selecting circuit 25 shown in FIG. 3 is caused to pass through the selecting circuit 48 without selection.

The structure of the selecting circuit 48 is simpler than that of the selecting circuit 25 shown in FIG. 3. Consequently, the structure of the feedback circuit of the bidirectional pseudo-random number generating circuit shown in FIG. 6 is so simplified that the scale of the whole bidirectional pseudo-random number generating circuit can be reduced. Pseudo-random number sequences output from the bidirectional pseudo-random number generating circuit shown in FIG. 6 are the same as those output from the bidirectional pseudo-random number generating circuit shown in FIG. 3.

Figure 24:
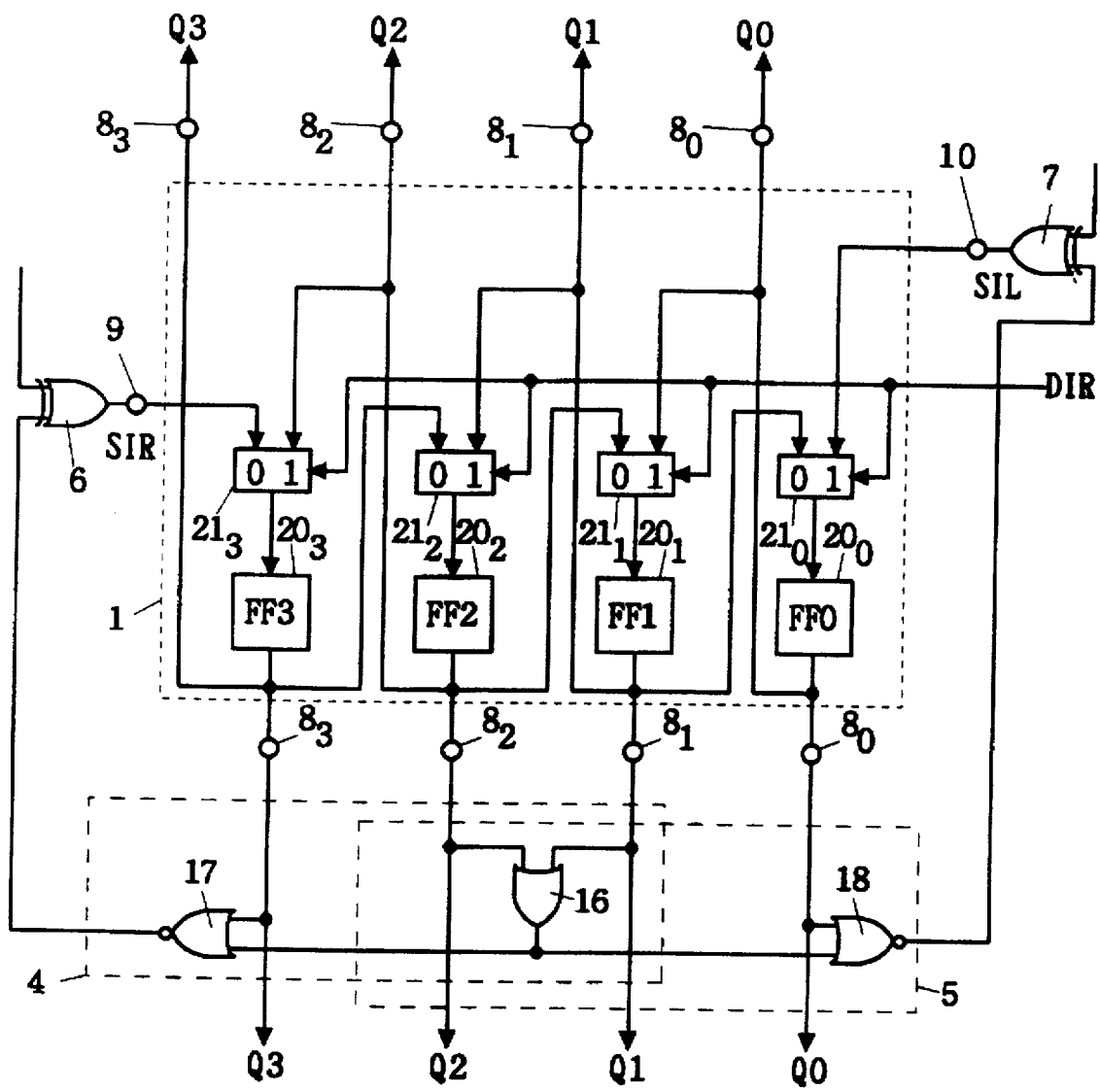
FIG. 24 is a circuit diagram showing the structure of a bidirectional shift register shown in FIG. 23.

If the structure of the bidirectional shift register 22 shown in FIG. 6 is the same as that of the bidirectional shift register shown in FIG. 24, a selector for selecting the outputs Q1 and Q3 is provided therein. Consequently, the selector can also function as the selector 51 of the selecting circuit 48. In this case, one of the selectors is not required.

While the structure in which the bidirectional pseudo-random number generating circuit according to the first preferred embodiment is improved has been described in the second preferred embodiment, the output of the bidirectional shift register selected by the selecting circuit which is common to the first and second groups of output terminals may be directly connected to the parity detecting circuit in the bidirectional pseudo-random number generating circuit according to the prior art. For example, the selectors 11 and 12 shown in FIG. 23 may be replaced with a selector for selectively outputting the output Q2 of the bidirectional shift register 1 and "0" to the parity detecting circuit 3, and the output terminal $8_3$ of the bidirectional shift register 1 may be directly connected to the parity detecting circuit 3. Also in this case, it is possible to obtain the same effects as in the above preferred embodiments.

<Third Preferred embodiment>

Figure 7:
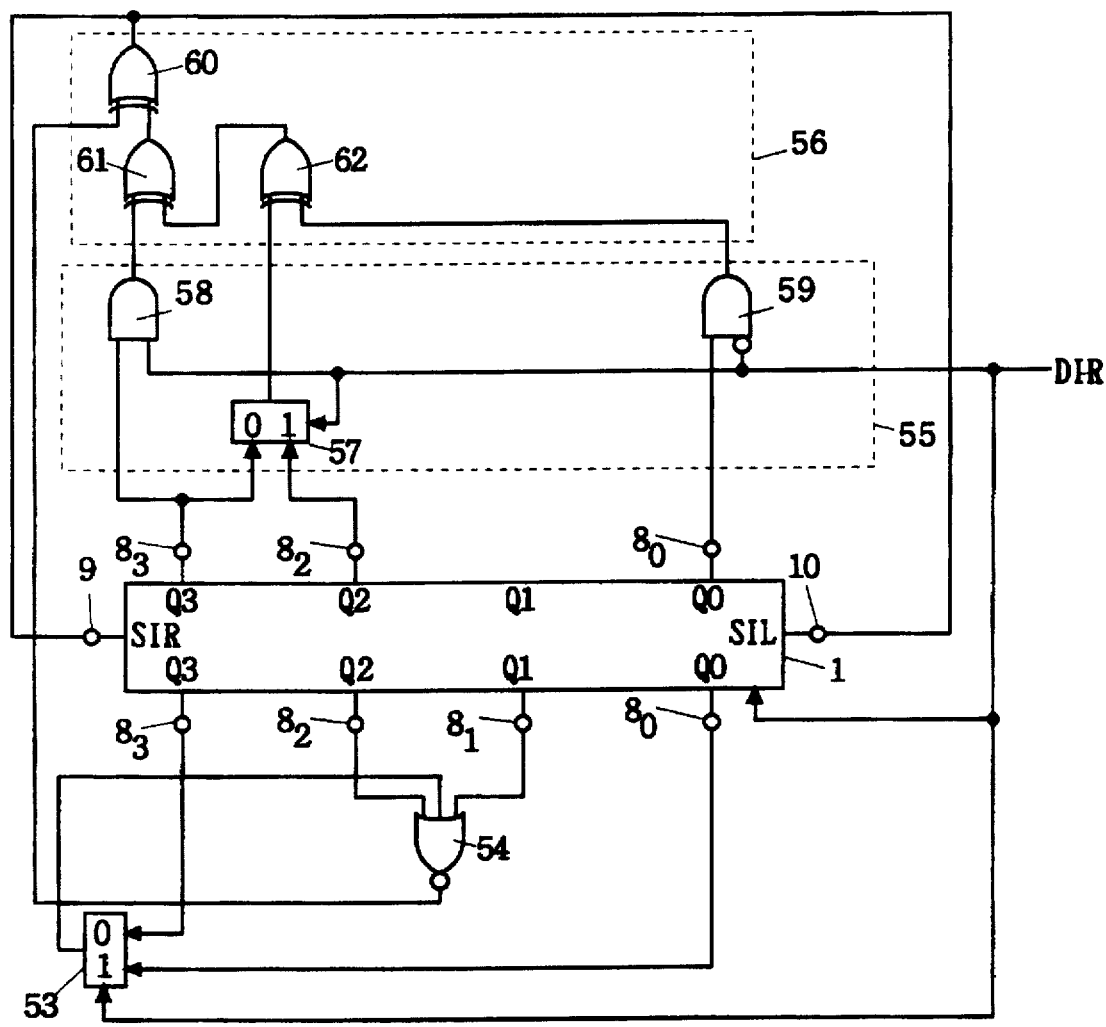
FIG. 7 is a block diagram showing the structure of a bidirectional pseudo-random number generating circuit according to a third embodiment of the present invention.

A bidirectional pseudo-random number generating circuit according to a third preferred embodiment of the present invention will be described below with reference to the drawing. FIG. 7 is a block diagram showing the structure of a bidirectional pseudo-random number generating circuit according to the third preferred embodiment of the present invention. In FIG. 7, the reference numeral 1 designates a bidirectional shift register, which is the same as that of FIG. 23, that can input and output 4-bit data in series and in parallel while moving the 4-bit data right or left, the reference numeral 53 designates a first selecting circuit for selecting outputs Q0 and Q3 sent from rightmost and leftmost output terminals $8_0$ and $8_3$ of the bidirectional shift register 1 according to a shift direction control signal DIR, the reference numeral 54 designates a NOR circuit for performing the NOR operation of output terminals $8_1$ and $8_2$ of the bidirectional shift register 1 except for the output terminals $8_0$ and $8_3$ which output the least and most significant bits, and the output of the first selecting circuit 53, the reference numeral 55 designates a second selecting circuit for selectively outputting the outputs Q0, Q2 and Q3 of the bidirectional shift register 1 and "0" according to the shift direction control signal DIR, and the reference numeral 56 designates a parity detecting circuit for detecting that the number of "1" bits of a plurality of bits including the outputs of the NOR circuit 54 and the second selecting circuit 55 is even or odd, and for directly outputting the result of detection to right and left shift input terminals 9 and 10 of the bidirectional shift register 1.

The second selecting circuit 55 comprises a selector 57 for selectively outputting the output Q3 or Q2 of the bidirectional shift register 1 according to the shift direction control signal DIR, a gate 58 for outputting AND of the output Q3 of the bidirectional shift register 1 and the shift direction control signal DIR, and a gate 59 for outputting AND of NOT of the shift direction control signal DIR and the output Q0 of the bidirectional shift register 1.

The parity detecting circuit 56 comprises an XOR gate 60 having a first input end for receiving the output of the NOR circuit 54, a second input end, and an output end connected to the right and left shift input terminals 9 and 10 of the bidirectional shift register 1, an XOR gate 61 having a first input end for receiving the output of the gate 58, a second input end, and an output end connected to the second input end of the XOR gate 60, and an XOR gate 62 having a first input end for receiving the output of the selector 57, a second input end for receiving the output of the gate 59, and an output end connected to the second input end of the XOR gate 61.

The bidirectional pseudo-random number generating circuit shown in FIG. 7 selectively sends the outputs Q0 and Q3 from the output terminals $8_0$ and $8_3$ on both ends of the bidirectional shift register 1 to the NOR circuit 54 according to the shift direction control signal DIR. Consequently, the XOR gate 60 can function as the first and second XOR circuits 6 and 7 which are connected to the right and left shift input terminals 9 and 10 respectively in the bidirectional pseudo-random number generating circuit according to the prior art shown in FIG. 23. As a result, the bidirectional pseudo-random number generating circuit shown in FIG. 7 has the structure of the feedback circuit simplified and has smaller scale than that of the bidirectional pseudo-random number generating circuit according to the prior art shown in FIG. 23.

As a preferred example of the bidirectional pseudo-random number generating circuit shown in FIG. 7, the selectors 11 and 13 shown in FIG. 23 are replaced with the gate circuits 58 and 59, which is not essential to the present invention.

<Fourth Preferred embodiment>

A bidirectional pseudo-random number generating circuit according to a fourth preferred embodiment of the present invention will be described below with reference to the drawings.

Figure 8:
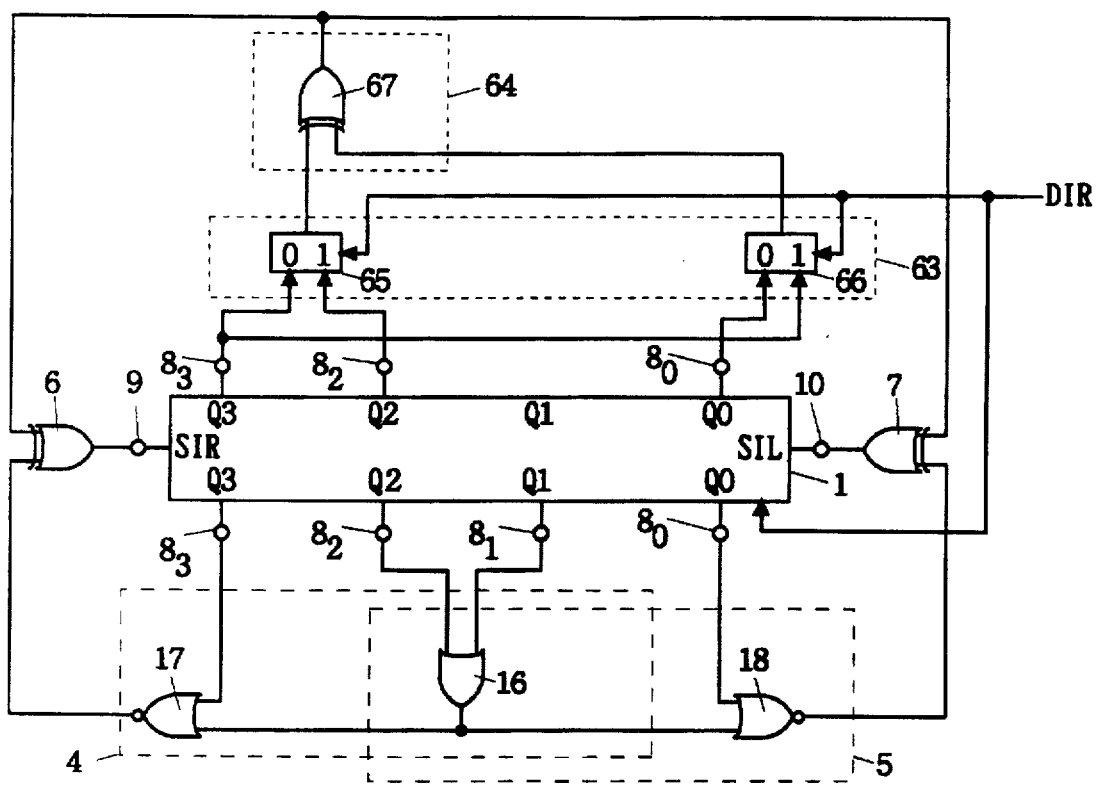
FIG. 8 is a block diagram showing the structure of a bidirectional pseudo-random number generating circuit according to a first mode of a fourth embodiment of the present invention.

FIG. 8 is a block diagram showing the structure of a 4-bit bidirectional pseudo-random number generating circuit according to a first mode of the fourth preferred embodiment of the present invention. In FIG. 8, the reference numeral 63 designates a selecting circuit for inputting outputs Q0, Q2 and Q3 of a bidirectional shift register 1 and for only selecting the outputs of the bidirectional shift register 1 according to a shift direction control signal DIR, the reference numeral 64 designates a parity detecting circuit for detecting that the number of "1" bits of a plurality of bits forming data output from the selecting circuit 63 is even or odd and for outputting the result of detection to the first input ends of first and second XOR circuits 6 and 7, and the same reference numerals designate the same portions as in FIG. 23.

The selecting circuit 63 comprises a selector 65 for selectively outputting the output Q3 or Q2 of the bidirectional shift register 1 according to the shift direction control signal DIR, and a selector 66 for selectively outputting the output Q3 or Q0 of the bidirectional shift register 1 according to the shift direction control signal DIR.

The parity detecting circuit 64 comprises an XOR gate 67 having a first input end for receiving the output of the selector 65, a second input end for receiving the output of the selector 66, and an output end connected to the first input ends of the first and second XOR circuits 6 and 7 in common. The second input ends of the first and second XOR circuits 6 and 7 are connected to the output ends of NOR gates 17 and 18 respectively similarly to the bidirectional pseudo-random number generating circuit shown in FIG. 23.

The bidirectional pseudo-random number generating circuit shown in FIG. 8 differs from that of the prior art shown in FIG. 23 in the following respect. The selectors 11 and 13 of the selecting circuit 2 according to the prior art are provided in order to select the most significant bit of the output of the bidirectional shift register 1 or "0", and the least significant bit of the output of the bidirectional shift register 1 or "0". On the other hand, the selector 66 of the selecting circuit 63 shown in FIG. 8 selects the most and least significant bits of the bidirectional shift register 1. Such a structure can be obtained because the parity detecting circuit decides whether the number of "1" bits is even or odd so that the result has no difference irrespective of the input of "0". Accordingly, pseudo-random number sequences generated by the bidirectional pseudo-random number generating circuit shown in FIG. 8 are the same as those generated by the bidirectional pseudo-random number generating circuit shown in FIG. 23.

By the structure shown in FIG. 8, the number of the XOR selectors of the selecting circuit 63 and that of the XOR gates of the parity detecting circuit 64 shown in FIG. 8 can be reduced more than in the selecting circuit 2 and the parity detecting circuit 3 shown in FIG. 23. According to the bidirectional pseudo-random number generating circuit shown in FIG. 8, thus, the structure of the feedback circuit can be so simplified that the scale can be reduced more than in the prior art.

Figure 9:
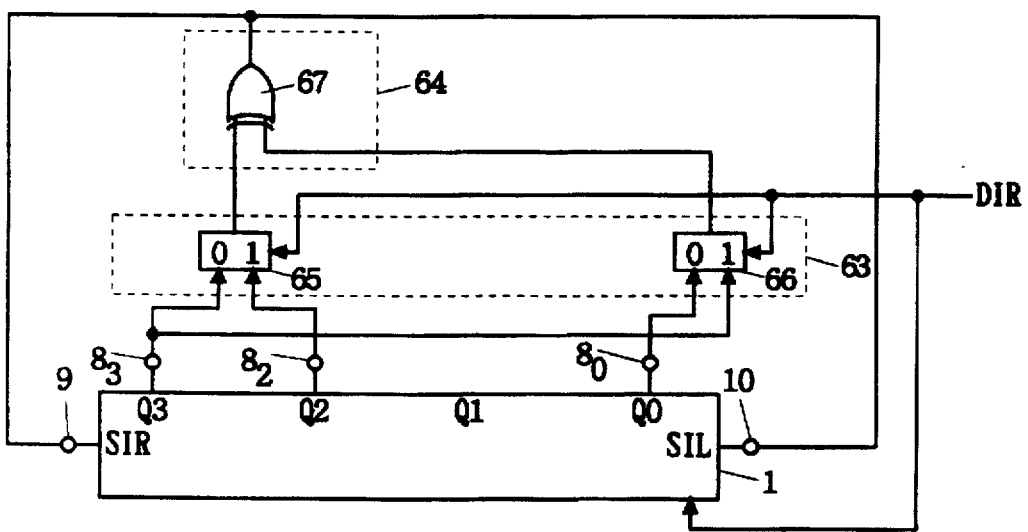
FIG. 9 is a block diagram showing the structure of a bidirectional pseudo-random number generating circuit according to a second mode of the fourth embodiment of the present invention.

FIG. 9 is a block diagram showing the structure of a 4-bit bidirectional pseudo-random number generating circuit according to a second mode of the fourth preferred embodiment of the present invention. In FIG. 9, the same reference numerals designate the same portions as in FIG. 8. The bidirectional pseudo-random number generating circuit of FIG. 9 differs from that of FIG. 8 in that the first and second NOR circuits 4 and 5 and the first and second XOR circuits 6 and 7 of the feedback circuit are omitted and the output of a parity detecting circuit 64 is directly connected to right and left shift input terminals 9 and 10 of a bidirectional shift register 1.

For this reason, the bidirectional pseudo-random number generating circuit shown in FIG. 9 is prohibited from generating (Q3, Q2, Q1, Q0)=(0, 0, 0, 0) of $2^4$ kinds of pseudo-random numbers which are generated by the bidirectional pseudo-random number generating circuit shown in FIG. 8. In the bidirectional pseudo-random number generating circuit shown in FIG. 9, when all outputs are "0", they are not changed even if a shift clock is given. For this reason, the bidirectional pseudo-random number generating circuit shown in FIG. 9 must be reset to other states than the state in which all the outputs are "0". Such reset can be implemented by using a flip-flop circuit having the set/reset function which forms the bidirectional shift register 1. A gate may be inserted in the first stage of the right shift input terminal 9 or the left shift input terminal 10 in such a manner that "1" is forcibly included in a right shift signal SIR or a left shift signal SIL. Also in the case where the gate is inserted in the input of the flip-flop circuit to change the input from "0" to "1" according to a signal sent from the outside, it is possible to perform reset necessary for the bidirectional pseudo-random number generating circuit shown in FIG. 9.

Figure 10:
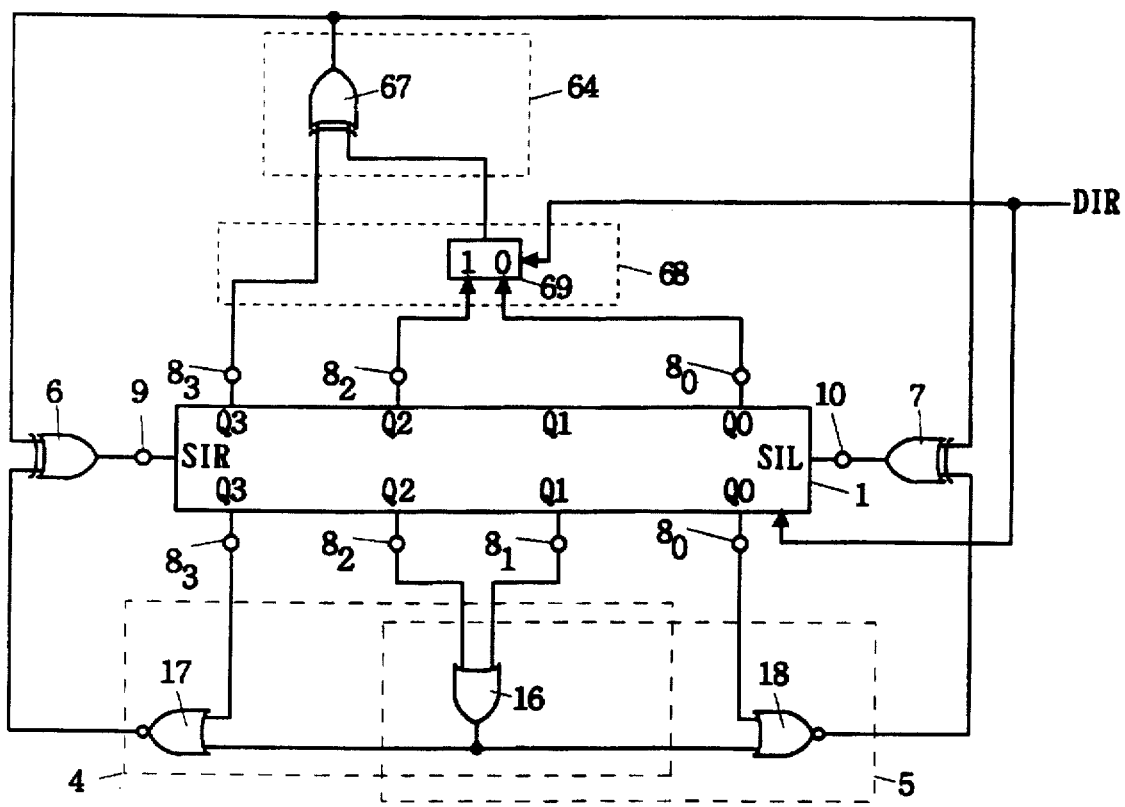
FIG. 10 is a block diagram showing the structure of a bidirectional pseudo-random number generating circuit according to a third mode of the fourth embodiment of the present invention.

FIG. 10 is a block diagram showing the structure of a 4-bit bidirectional pseudo-random number generating circuit according to a third mode of the fourth preferred embodiment of the present invention. In FIG. 10, the reference numeral 68 designates a selecting circuit for inputting outputs Q0 and 02 of a bidirectional shift register 1 and for selecting the output of the bidirectional shift register 1 according to a shift direction control signal DIR, and the same reference numerals designate the same portions as in FIG. 8. The bidirectional pseudo-random number generating circuit of FIG. 10 differs from that of FIG. 8 in that the structure of the selecting circuit 68 is different from that of the selecting circuit 63.

In the selecting circuit 68, unlike the selecting circuit 63, a selector 69 selects the outputs Q2 and Q0 of the bidirectional shift register 1 and a selector which selects an output Q3 is not provided. Consequently, the output 03 is directly sent to a parity detecting circuit 64. Thus, the selecting circuit 68 can reduce the number of selectors more than the selecting circuit 63.

<Fifth Preferred embodiment>

A bidirectional pseudo-random number generating circuit according to a fifth preferred embodiment of the present invention will be described below with reference to the drawings.

Figure 11:
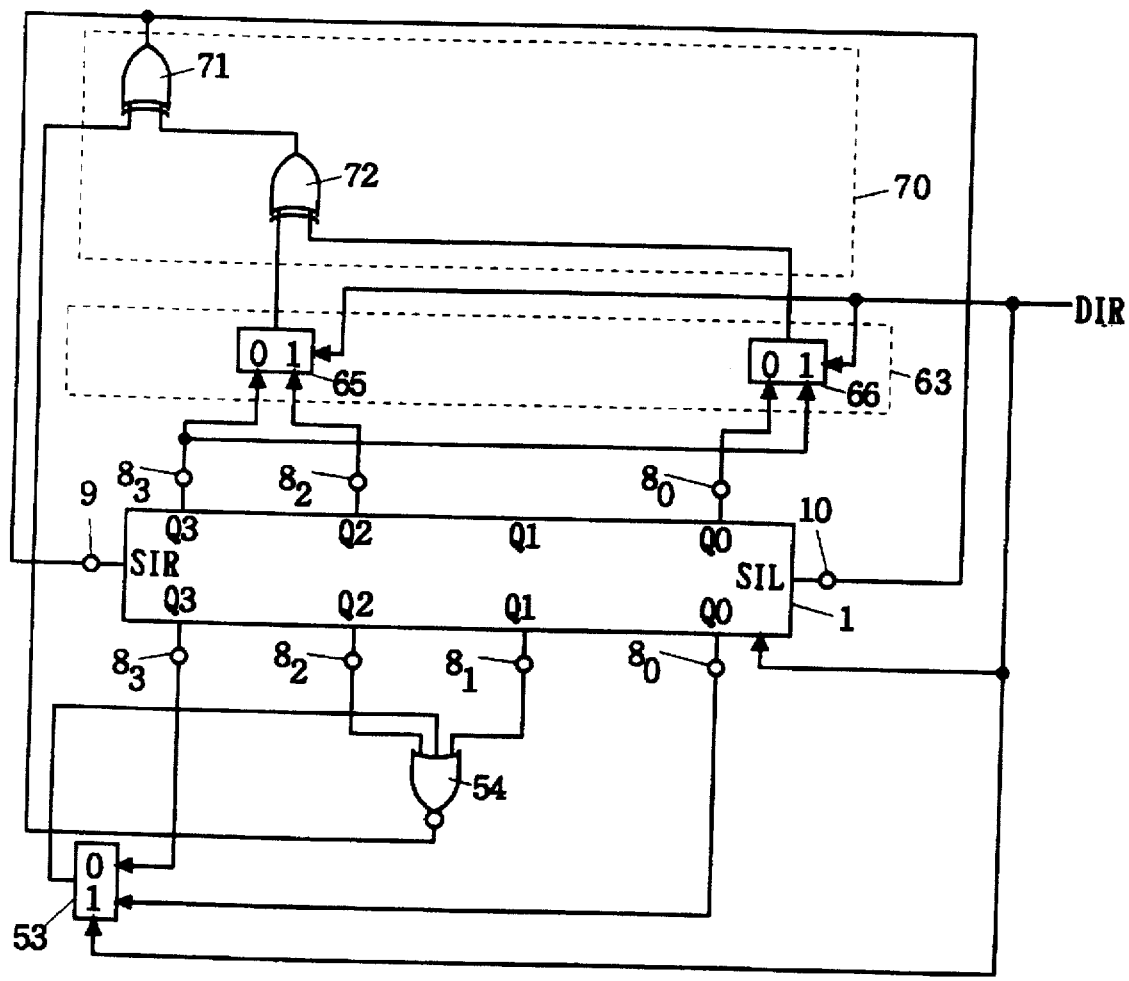
FIG. 11 is a block diagram showing the structure of a bidirectional pseudo-random number generating circuit according to a first mode of a fifth embodiment of the present invention.

FIG. 11 is a block diagram showing the structure of a 4-bit bidirectional pseudo-random number generating circuit according to a first mode of the fifth preferred embodiment of the present invention. In FIG. 11, the reference numeral 70 designates a parity detecting circuit for detecting that the number of "1" bits of a plurality of bits including the outputs of a NOR circuit 54 and a second selecting circuit 63 is even or odd and for outputting the result of detection to right and left shift input terminals 9 and 10 of a bidirectional shift register 1, and the same reference numerals designate the same portions as in FIG. 7 or 8.

The parity detecting circuit 70 comprises an XOR gate 72 for performing the exclusive-OR operation of the outputs of selectors 65 and 66, and an XOR gate 71 for performing the exclusive-OR operation of the outputs of the XOR gate 72 and the NOR circuit 54 and for outputting the result of the operation to the right and left shift input terminals 9 and 10 of the bidirectional shift register 1 at the same time.

The bidirectional pseudo-random number generating circuit shown in FIG. 11 has the characteristics of the bidirectional pseudo-random number generating circuits according to the third and fourth preferred embodiments. Accordingly, the scale of the circuit can be reduced greatly so that the best effects can be obtained as compared with the bidirectional pseudo-random number generating circuit according to the prior art as in FIG. 23.

Figure 12:
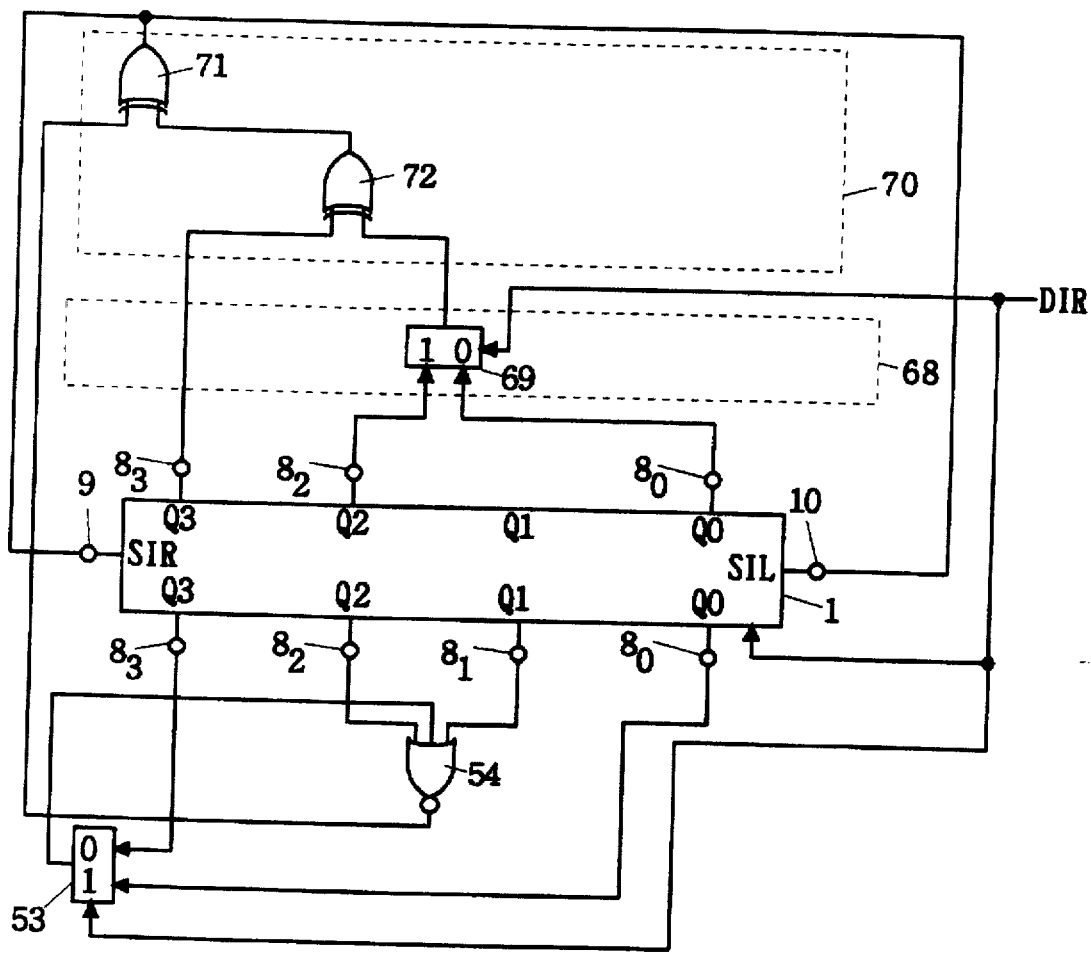
FIG. 12 is a block diagram showing the structure of a bidirectional pseudo-random number generating circuit according to a second mode of the fifth embodiment of the present invention.

As described in the fifth preferred embodiment, the selectors 65 and 66 can be united. The bidirectional pseudo-random number generating circuit having such a structure is shown in FIG. 12. In FIG. 12, the same reference numerals designate the same portions as in FIG. 10 or 11.

<Sixth Preferred embodiment>

A bidirectional pseudo-random number generating circuit according to a sixth preferred embodiment of the present invention will be described below with reference to the drawings.

Figure 13:
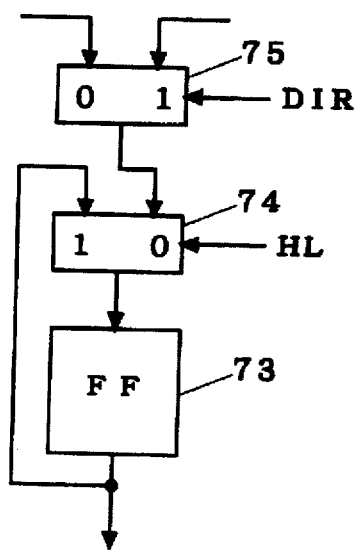
FIG. 13 is a block diagram for explaining the structure of a bidirectional pseudo-random number generating circuit which can hold data.

The bidirectional pseudo-random number generating circuits described in the first to fifth preferred embodiments have such a structure that data is necessarily shifted depending on the change of a clock. In general, a loop for connecting the output and input terminals of a flip-flop circuit 73 is provided as shown in FIG. 13 in order to get a structure in which the data is not shifted even if the clock is changed. For example, the flip-flop circuit $20_1$ and the selector $21_1$ shown in FIG. 24 are replaced with selectors 74 and 75 and the flip-flop circuit 73 shown in FIG. 13.

When a hold signal HL is "0", the output and input terminals of the flip-flop circuit 73 are connected to each other so that the selector 74 enters hold mode. When the hold signal HL is "1", the output of the selector 75 is sent to the flip-flop circuit 73 so that the selector 74 enters shift mode.

The selector 75 sends the outputs of flip-flop circuits which are provided on the right and left to the corresponding flip-flop circuit 73 according to a shift direction control signal DIR so that data is shifted right or left. A bidirectional shift register having such a structure has no selector for selecting the outputs of the adjacent flip-flop circuits. For this reason, it is hard to share selectors provided in the bidirectional shift register and a selecting circuit. The pseudo-random number generating circuit according to the sixth preferred embodiment has an improvement in this respect.

Figure 14:
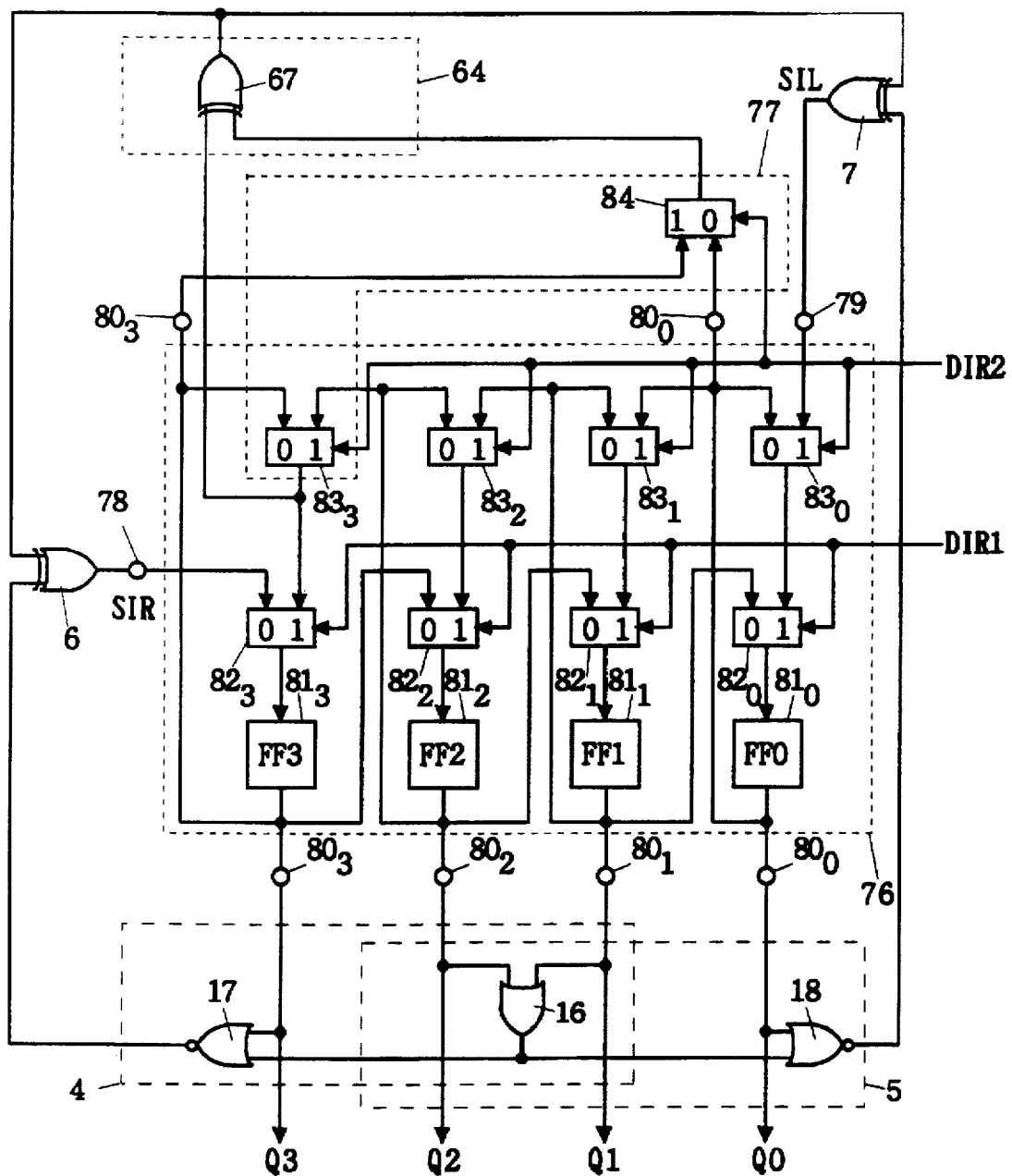
FIG. 14 is a block diagram showing the structure of a bidirectional pseudo-random number generating circuit according to a sixth embodiment of the present invention.

FIG. 14 is a block diagram showing the structure of a bidirectional pseudo-random number generating circuit according to the sixth preferred embodiment of the present invention. In FIG. 14, the reference numeral 76 designates a bidirectional shift register which can select that 4-bit data are input in series and output in parallel while moved right or left or that the 4-bit data are held irrespective of a clock according to a signal sent from the outside, the reference numeral 77 designates a selecting circuit for selectively sending outputs Q0, Q2 and Q3 of the bidirectional shift register 76 to a parity detecting circuit 64 according to a shift direction control signal DIR2, and the same reference numerals designate the same portions as in FIG. 10.

The bidirectional shift register 76 comprises four flip-flop circuits $81_0$ to $81_3$ and eight selectors $82_0$ to $82_3$ and $83_0$ to $83_3$. The flip-flop circuit $81_3$ has an output end connected to an output terminal $80_3$ for outputting a most significant bit and an input end for receiving the output of the selector $82_3$. The flip-flop circuit $81_0$ has an output end connected to an output terminal $8_0$ for outputting a least significant bit and an input end for receiving the output of the selector $82_0$. The flip-flop circuits $81_1$ and $81_2$ have output ends connected to corresponding output terminals $80_1$ and $80_2$, and input ends for receiving the outputs of the selectors $82_1$ and $82_2$, respectively. When a shift direction control signal DIR1 is "0", the selector $82_3$ outputs right shift data SIR which is to be input from a right shift input terminal 78 and shifted right to the input end of the flip-flop circuit $81_3$. When the shift direction control signal DIR1 is "1", the selector $82_3$ sends the output of the selector $83_3$ to the input end of the flip-flop circuit $81_3$.

The flip-flop circuits $81_0$ to $81_2$ have output ends connected to the corresponding output terminals $80_0$ to $80_2$, and input ends for receiving the outputs of the corresponding selectors $82_0$ to $82_2$. When the shift direction control signal DIR1 is "0", the selectors $82_0$ to $82_2$ send the outputs of the flip-flop circuits $81_1$ to $81_3$ which are provided on the left to the input ends of the corresponding flip-flop circuits $81_0$ to $81_2$. When the shift direction control signal DIR1 is "1", the selectors $82_0$ to $82_2$ send the outputs of the corresponding selectors $83_0$ to $83_2$ to the input ends of the corresponding flip-flop circuits $81_0$ to $81_2$. When the shift direction control signal DIR2 is "1", the selector $83_0$ sends left shift data SIL which is to be input from a left shift input terminal 79 and shifted left to the selector $82_0$. When the shift direction control signal DIR2 is "0", the selector $83_0$ sends the output of the flip-flop circuit $81_0$ to the selector $82_0$. When the shift direction control signal DIR2 is "1", the selectors $83_1$ to $83_3$ send the outputs of the flip-flop circuits $81_0$ to $81_2$ which are provided on the right to the input ends of the corresponding selectors $82_1$ to $82_3$. When the shift direction control signal DIR2 is "0", the selectors $83_1$ to $83_3$ send the outputs of the corresponding flip-flop circuits $81_1$ to $81_3$ to the corresponding selectors $82_1$ to $82_3$.

The selectors $82_0$ to $82_3$ and $83_0$ to $8_3$ form path switching means for changing a connection between the input and output ends of the flip-flop circuits $81_0$ to $81_3$ which are a kind of data holding means and for switching a path through which data is transmitted.

The selecting circuit 77 comprises the selector $83_3$ for selectively sending the outputs Q2 and Q3 of the bidirectional shift register 76 to the first input end of an XOR gate 67, and a selector 84 for selectively sending the outputs Q0 and Q3 of the bidirectional shift register 76 to the second input end of the XOR gate 67.

The selector $83_3$ provided in the bidirectional shift register 76 is also used as the selector of the selecting circuit 77 provided in a feedback circuit for generating bidirectional pseudo-random numbers.

Consequently, the number of the selectors provided in the selecting circuit is so reduced that the structure of the feedback circuit can be simplified. As a result, the scale of the circuit can be reduced.

In order for the bidirectional shift register 76 shown in FIG. 14 to share the selector with the selecting circuit easily, the selectors $83_0$ to $83_3$ for selecting the outputs of the adjacent flip-flop circuits are included in the path switching means. The reason is that a structure in which the adjacent flip-flop circuits are selected by the selecting circuit appears comparatively often in the bidirectional pseudo-random number generating circuit.

When the shift direction control signal DIR1 is "0", the bidirectional shift register 76 enters right shift mode in which the right shift data SIR is input in series and output in parallel while shifted right (the shift direction control signal DIR2 may be "0" or "1"). In this case, the input ends of the flip-flop circuits $81_2$ to $81_0$ are connected to the output ends of the left flip-flop circuits by the path switching means.

When the shift direction control signals DIR1 and DIR2 are "1" and "0" respectively, the bidirectional shift register 76 enters the hold mode for holding the outputs Q0 to Q3 at that time. In the hold mode, the output ends of the flip-flop circuits $81_0$ to $81_3$ are connected to the inputs ends thereof, and output data act as input data.

When the shift direction control signals DIR1 and DIR2 are "1", the bidirectional shift register 76 enters left shift mode in which the left shift data SIL is input in series and output in parallel while shifted left. In this case, the input ends of the flip-flop circuits $81_1$ to $81_3$ are connected to the output ends of the right flip-flop circuits by the path switching means.

Figure 15:
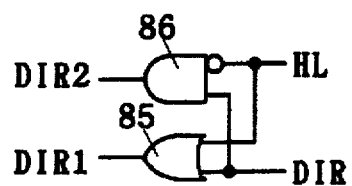
FIG. 15 is a logic diagram showing the structure of a converting circuit for converting the control signal of the bidirectional pseudo-random number generating circuit.

FIG. 15 shows an example of the structure of a converting circuit for generating the shift direction control signals DIR1 and DIR2 from the signal HL for specifying the hold mode for holding data or the shift mode for shifting data and the shift direction control signal DIR for switching the shift direction of data for the bidirectional shift register. In FIG. 15, the reference numeral 85 designates an OR gate for performing the OR operation of the signal HL and the shift direction control signal DIR to output the shift direction control signal DIR1, and the reference numeral 86 designates a gate for performing the AND operation of the inverted logic of the signal HL and the shift direction control signal DIR to output the shift direction control signal DIR2.

When the signal HL is "0" and the shift direction control signal DIR is "0", the shift direction control signal DIR1 is "0". Consequently, the bidirectional shift register 76 enters the right shift mode.

When the signal HL is "1", the shift direction control signals DIR1 and DIR2 are "1" and "0" respectively. Consequently, the bidirectional shift register 76 enters the hold mode.

When the signals HL and DIR are "0" and "1" respectively, the shift direction control signals DIR1 and DIR2 are "1". Consequently, the bidirectional shift register 76 enters the left shift mode.

<Seventh Preferred embodiment>

A bidirectional pseudo-random number generating circuit according to a seventh preferred embodiment of the present invention will be described below with reference to the drawing.

Figure 16:
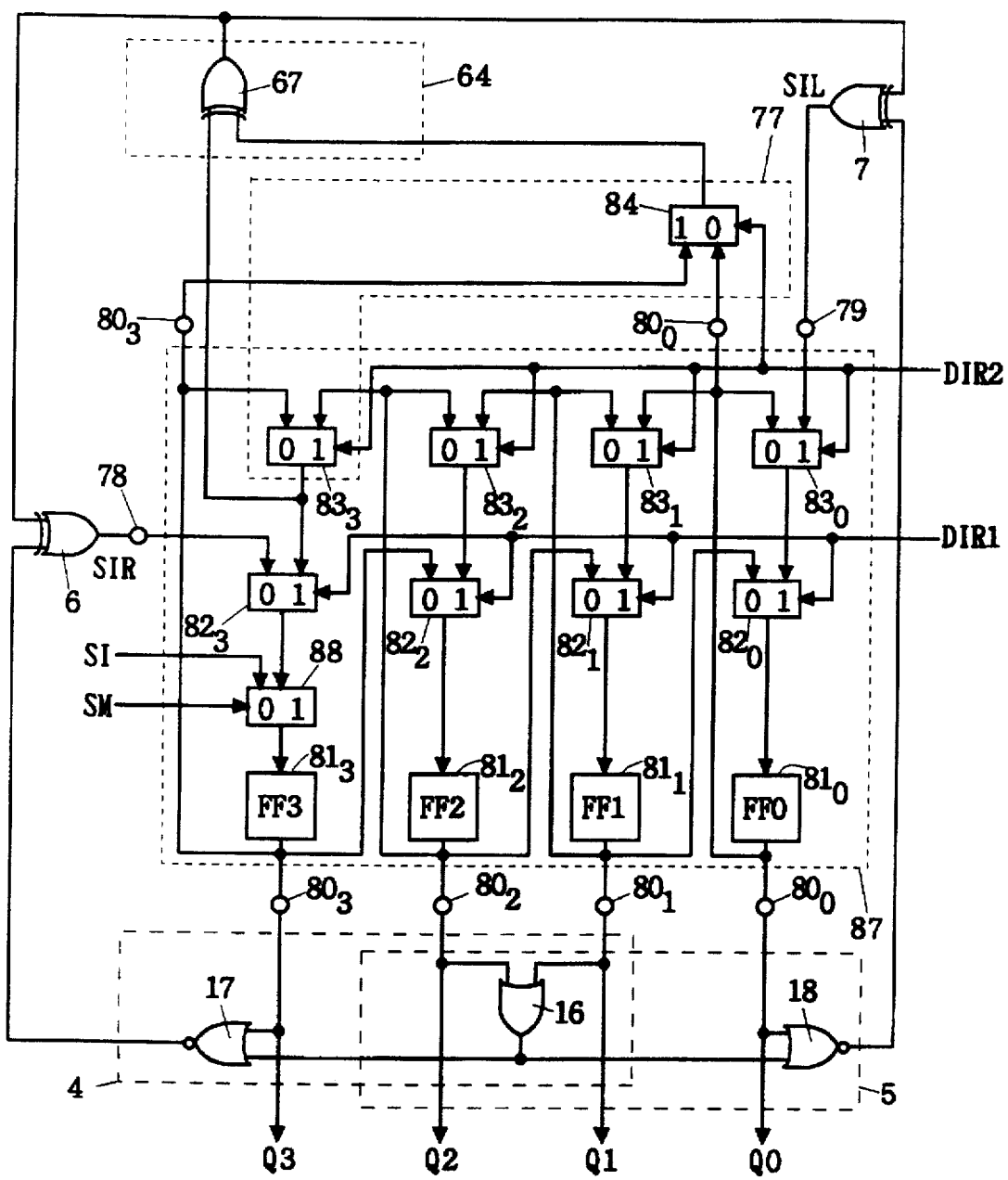
FIG. 16 is a block diagram showing the structure of a bidirectional pseudo-random number generating circuit according to a seventh embodiment of the present invention.

FIG. 16 is a block diagram showing the structure of a bidirectional pseudo-random number generating circuit according to the seventh preferred embodiment of the present invention. In FIG. 16, the reference numeral 87 designates a bidirectional shift register which can select that 4-bit data are input in series and output in parallel while moved right or left or that the 4-bit data are held irrespective of a clock according to a signal sent from the outside, and the same reference numerals designate the same portions as in FIG. 14.

The bidirectional shift register 87 shown in FIG. 16 differs from the bidirectional shift register 76 shown in FIG. 14 in that a scan selector 88 is provided. The scan selector 88 is inserted between the input end of a flip-flop circuit $81_3$ and a selector $82_3$. In addition, the scan selector 88 is provided in the data transmission path of the bidirectional shift register 87, and sends necessary data to flip-flop circuits $81_0$ to $81_3$ during a scan test and nullifies right shift data SIR.

When a shift direction control signal DIR1 is "0" and a scan mode signal SM is "1", data SI used for the scan test are shifted right and set to the flip-flop circuits $81_3$ to $81_0$. At this time, the bidirectional shift register 87 can perform serial shift operation of scan pass (SI to Q0).

According to the above structure, an additional circuit is provided so that the bidirectional pseudo-random number generating circuit which can perform the scan test is obtained.

Figure 17:
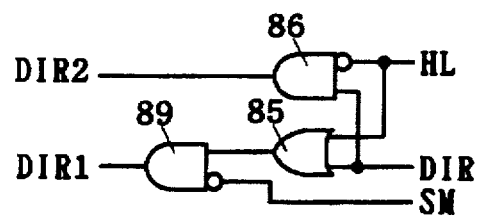
FIG. 17 is a logic diagram showing the structure of a converting circuit for converting the control signal of the bidirectional pseudo-random number generating circuit.

FIG. 17 is a logic diagram showing an example of the structure of a converting circuit for generating shift direction control signals DIR1 and DIR2 from a signal HL for specifying the hold mode which holds data or the shift mode which shifts data, a shift direction control signal DIR for switching the shift direction of data for the bidirectional shift register, and the scan mode signal SM for specifying whether scan mode is used or not. In FIG. 17, the reference numeral 89 designates a gate for performing the AND operation of the output of an OR gate 85 and the inverted logic of the scan mode signal SM to generate the shift direction control signal DIR1, and the same reference numerals designate the same portions as in FIG. 15.

The gate 89 is added in such a manner that the shift direction control signal DIR1 is forcibly set to 0 (right shift) as shown in FIG. 17 when the scan mode signal SM is "1".

While the case where the scan pass can be performed in the right shift mode has been described in the seventh preferred embodiment, the scan pass may be formed in the left shift mode. This can be implemented by inserting the same one as the scan selector 88 between a selector $83_0$ and the flip-flop circuit $81_0$. In this case, it is needless to say that the structure of the converting circuit must be changed.

<Eighth Preferred embodiment>

A bidirectional pseudo-random number generating circuit according to an eighth preferred embodiment of the present invention will be described below with reference to the drawing.

Figure 18:
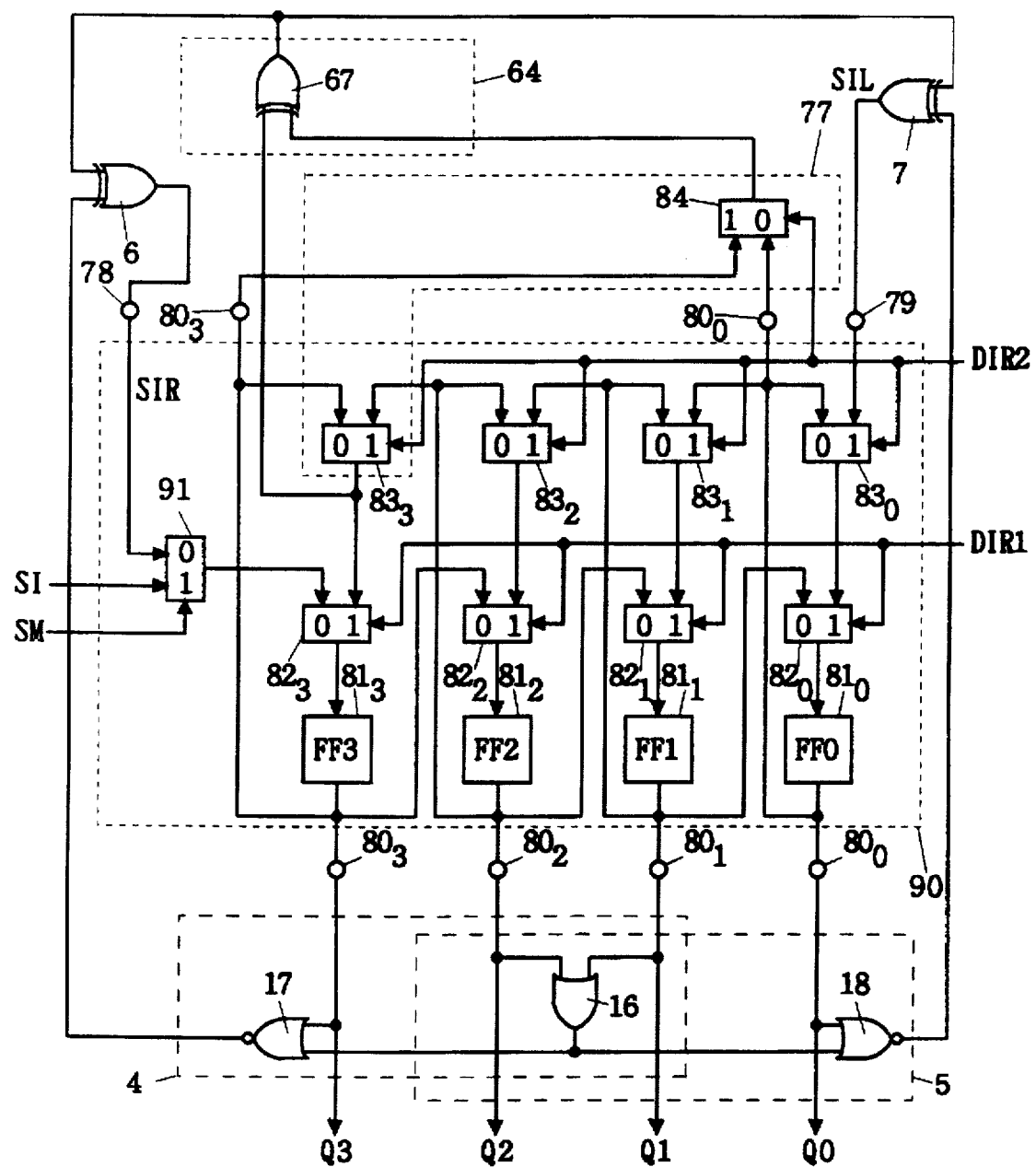
FIG. 18 is a block diagram showing the structure of a bidirectional pseudo-random number generating circuit according to an eighth embodiment of the present invention.

FIG. 18 is a block diagram showing the structure of a bidirectional pseudo-random number generating circuit according to the eighth preferred embodiment of the present invention. In FIG. 18, the reference numeral 90 designates a bidirectional shift register which can select that 4-bit data are input in series and output in parallel while moved right or left or that the 4-bit data are held irrespective of a clock according to a signal sent from the outside, and the same reference numerals designate the same portions as in FIG. 14.

The bidirectional shift register 90 shown in FIG. 18 differs from the bidirectional shift register 87 shown in FIG. 16 in that a scan selector is inserted in a different place. A scan selector 91 is inserted between a right shift input terminal 78 and a selector $82_3$, and works in the same way as the scan selector 88. The bidirectional pseudo-random number generating circuit according to the eighth preferred embodiment produces the same effects as those of the bidirectional pseudo-random number generating circuit according to the seventh preferred embodiment.

While the case where scan pass can be performed in right shift mode has been described in the eighth preferred embodiment, scan pass may be performed in left shift mode. This can be implemented by inserting the same one as the scan selector 91 between a left shift input terminal 79 and a selector $83_0$. In this case, it is needless to say that the structure of a converting circuit must be changed.

<Ninth Preferred embodiment>

A bidirectional pseudo-random number generating circuit according to a ninth preferred embodiment of the present invention will be described below with reference to the drawing.

FIG. 19 is a block diagram showing the structure of a bidirectional pseudo-random number generating circuit according to the ninth preferred embodiment of the present invention. In FIG. 19, the same reference numerals designate the same portions as in FIG. 18.

The bidirectional pseudo-random number generating circuit of FIG. 19 differs from that of FIG. 18 in that the first NOR circuit 4, the second NOR circuit 5, the first XOR circuit 6 and the second XOR circuit 7 are omitted. The relationship between the bidirectional pseudo-random number generating circuits shown in FIGS. 19 and 18 is the same as that between the bidirectional pseudo-random number generating circuits shown in FIGS. 9 and 8. The bidirectional pseudo-random number generating circuit according to the ninth preferred embodiment produces the same effects as those of the bidirectional pseudo-random number generating circuit according to the eighth preferred embodiment.

The bidirectional pseudo-random number generating circuit shown in FIG. 19 is prohibited from generating the state in which all outputs are "0". For this reason, it is necessary to reset the bidirectional pseudo-random number generating circuit shown in FIG. 19 to other states than the state in which all outputs are "0". Since such reset is performed in the same way as in the bidirectional pseudo-random number generating circuit of FIG. 9, the description will be omitted.

<Tenth Preferred embodiment>

Figure 20:
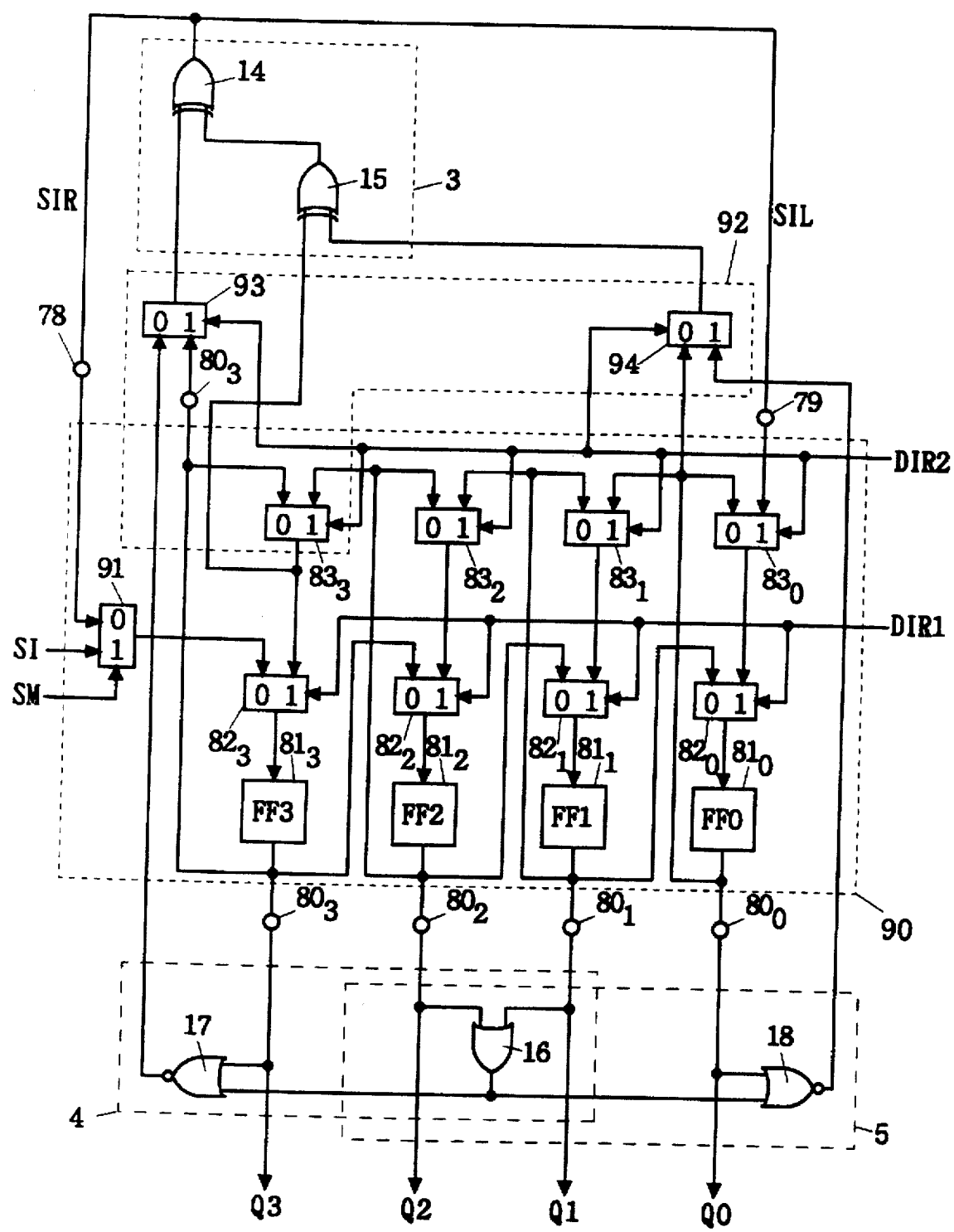
FIG. 20 is a block diagram showing the structure of a bidirectional pseudo-random number generating circuit according to a tenth embodiment of the present invention.

FIG. 20 is a block diagram showing the structure of a bidirectional pseudo-random number generating circuit according to a tenth preferred embodiment of the present invention. In FIG. 20, the reference numeral 92 designates a selecting circuit for inputting outputs Q0, Q2 and Q3 of a bidirectional shift register 90 and the outputs of first and second NOR circuits 4 and 5 and for selectively outputting them to a parity detecting circuit 3 according to a shift direction control signal DIR2, and the same reference numerals designate the same portions as in FIG. 1 or 18.

The selecting circuit 92 comprises a selector 93 for selecting the output of the first NOR circuit 4 when the shift direction control signal DIR2 is "0", for selecting the output Q3 of the bidirectional shift register 90 when the shift direction control signal DIR2 is 1 and for outputting the result of selection to the first input end of an XOR gate 14, a selector 83₃ for outputting the result of selection to the first input end of an XOR gate 15, and a selector 94 for selecting the output of the second NOR circuit 5 when the shift direction control signal DIR2 is "1", for selecting the output Q0 of the bidirectional shift register 90 when the shift direction control signal DIR2 is "0" and for outputting the result of selection to the second input end of the XOR gate 15.

In the bidirectional pseudo-random number generating circuit shown in FIG. 20, the bidirectional shift register 1 shown in FIG. 1 is replaced with the bidirectional shift register 90 of the bidirectional pseudo-random number generating circuit shown in FIG. 18. The selecting circuit 92 and the bidirectional shift register 90 share the selector 83₃. Accordingly, the bidirectional pseudo-random number generating circuit according to the tenth preferred embodiment has the characteristics of the bidirectional pseudo-random number generating circuits according to the sixth and eighth preferred embodiments in addition to the first preferred embodiment, and produces the same effects as in these preferred embodiments.

The bidirectional shift register 1 of the bidirectional pseudo-random number generating circuit shown in FIG. 1 is replaced with the bidirectional shift register 90 in FIG. 20. The bidirectional shift register 87 described in the seventh preferred embodiment may be used. Also in this case, it is possible to obtain the same effects as in the above preferred embodiment.

If scan design is not necessary, the scan selector 91 and the gate 89 for the signal SM shown in FIG. 17 can be omitted.

<Eleventh Preferred embodiment>

Figure 21:
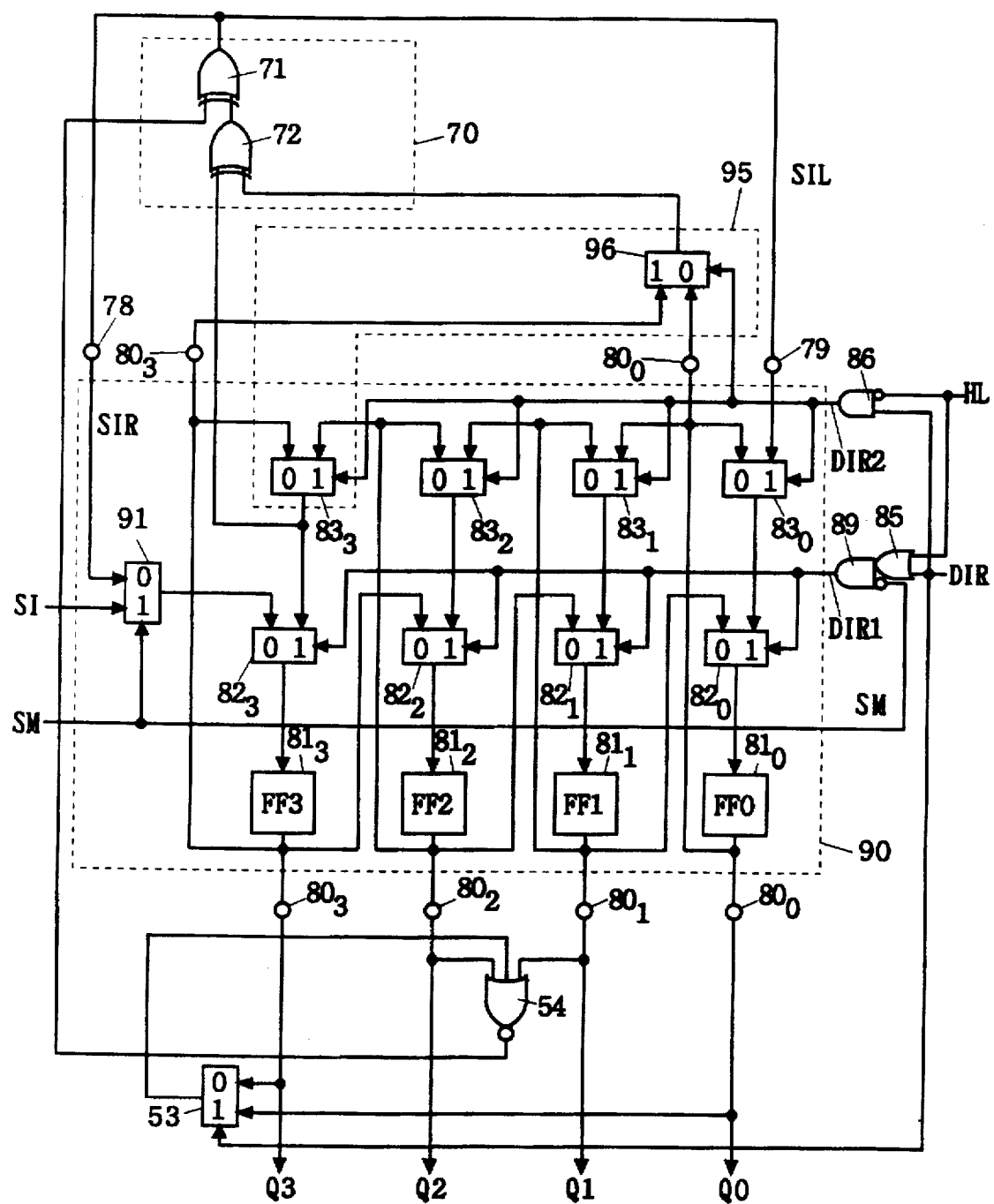
FIG. 21 is a block diagram showing the structure of a bidirectional pseudo-random number generating circuit according to a first mode of an eleventh embodiment of the present invention.

FIG. 21 is a block diagram showing the structure of a bidirectional pseudo-random number generating circuit according to an eleventh preferred embodiment of the present invention. In FIG. 21, the reference numeral 95 designates a selecting circuit for inputting outputs Q0, Q2 and Q3 of a bidirectional shift register 90 and the output of a NOR circuit 54 and for selectively outputting them to a parity detecting circuit 70 according to a shift direction control signal DIR2, and the same reference numerals designate the same portions as in FIG. 11, 17 or 18.

The selecting circuit 95 comprises a selector 96 for selecting the output Q0 of the bidirectional shift register 90 when the shift direction control signal DIR2 is "0", for selecting the output Q3 of the bidirectional shift register 90 when the shift direction control signal DIR2 is 1 and for outputting the result of selection to the second input end of an XOR gate 72, and a selector 83₃ for outputting the result of selection to the first input end of the XOR gate 72.

In the bidirectional pseudo-random number generating circuit shown in FIG. 21, the bidirectional shift register 1 shown in FIG. 11 is replaced with the bidirectional shift register 90 of the bidirectional pseudo-random number generating circuit shown in FIG. 18. The selecting circuit 95 and the bidirectional shift register 90 share the selector 833. Accordingly, the bidirectional pseudo-random number generating circuit according to the eleventh preferred embodiment has the characteristics of the bidirectional pseudo-random number generating circuits according to the sixth and eighth preferred embodiments in addition to the fifth preferred embodiment, and produces the same effects as in these preferred embodiments.

Figure 22:
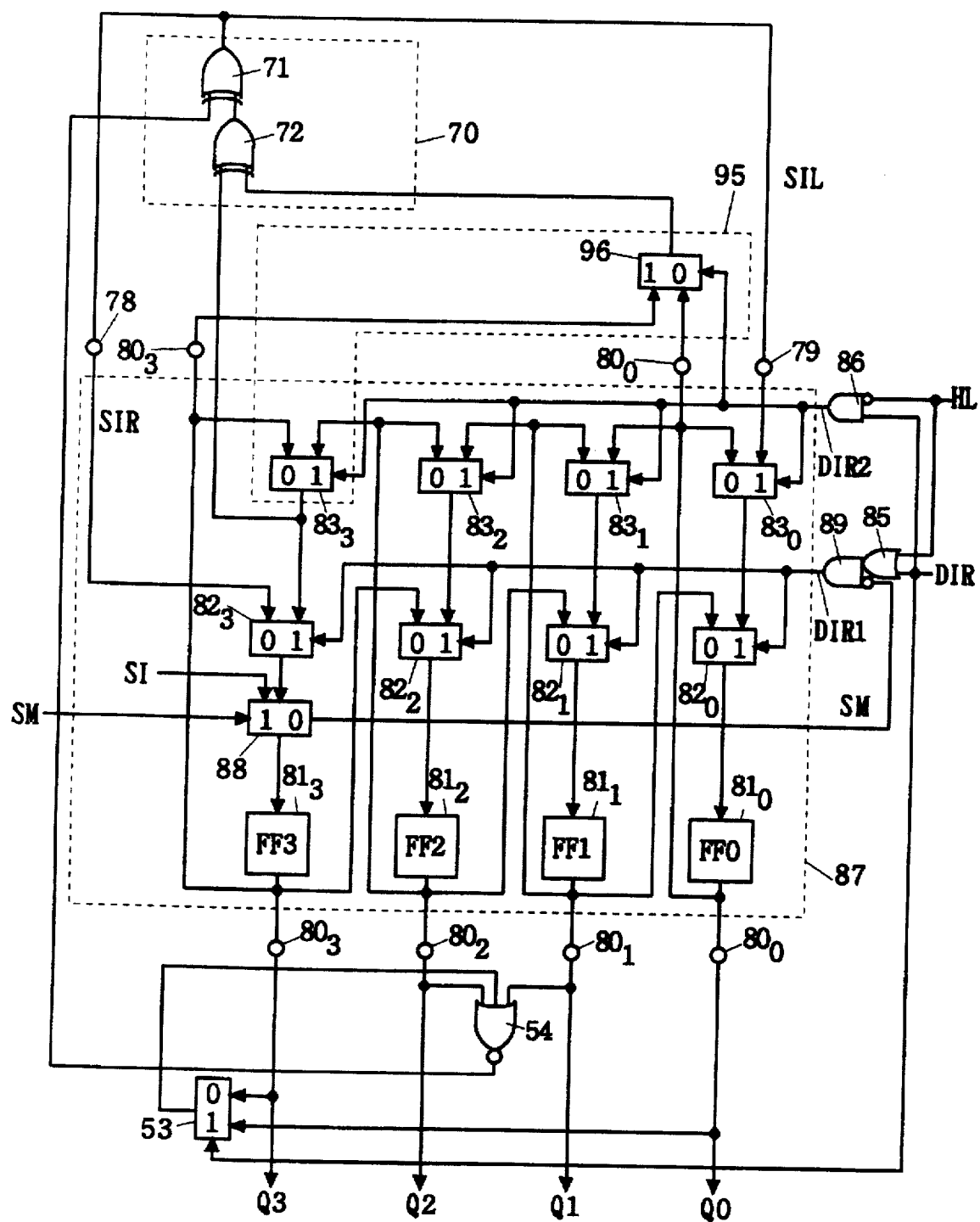
FIG. 22 is a block diagram showing the structure of a bidirectional pseudo-random number generating circuit according to a second mode of the eleventh embodiment of the present invention.

The bidirectional shift register 1 of the bidirectional pseudo-random number generating circuit shown in FIG. 11 is replaced with the bidirectional shift register 90 in FIG. 21. The bidirectional shift register 87 described in the seventh preferred embodiment may be used as shown in FIG. 22. Also in this case, it is possible to obtain the same effects as in the above preferred embodiment.

If scan design is not necessary, the scan selector 91 and the gate 89 for the signal SM can be omitted.

The flip-flop circuit according to the above preferred embodiments of the present invention may be replaced with a scan flip-flop circuit. By using the scan flip-flop circuit, scan data can be input from optional flip-flop circuits.

While the invention has been described in detail, the foregoing description is in all aspects illustrative and not restrictive. It is understood that numerous other modifications and variations can be devised without departing from the scope of the invention.

I claim:

1. A pseudo-random number generating circuit comprising:

a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series; and a feedback circuit for feeding back data according to signals output from said N output terminals of said bidirectional shift register to said right and left shift input terminals, wherein pseudo-random number sequences in which $2^N$ kinds of data each once appear in predetermined order can be output from said N output terminals of said bidirectional shift register, and normal or reverse order can be selected as said predetermined order by switching the shift direction of said bidirectional shift register according to a shift direction control signal, said feedback circuit comprising:

a parity check circuit for checking that the number of true bits of a plurality of bits forming a given data is even or odd and for directly outputting a signal corresponding to a result of check to said right and left shift input terminals;

a first NOR circuit for performing a NOR operation of data output from all output terminals of said bidirectional shift register except for the rightmost output terminal of said N output terminals of said bidirectional shift register, a second NOR circuit for performing a NOR operation of data output from all output terminals of said bidirectional shift register except for the leftmost output terminal of said N output terminals of said bidirectional shift register, and a selecting circuit for selecting first output data output from a first group of output terminals of said N output terminals of said bidirectional shift register and said first NOR circuit or second output data output from a second group of output terminals of said N output terminals and said second NOR circuit according to said shift direction control signal, and for sending selected data to said parity check circuit.

2. A pseudo-random number generating circuit comprising:

a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series; and a feedback circuit for feeding back data according to signals output from said N output terminals of said bidirectional shift register to said right and left shift input terminals, wherein pseudo-random number sequences in which $2^N$ kinds of data each once appear in predetermined order can be output from said N output terminals of said bidirectional shift register, and normal or reverse order can be selected as said predetermined order by switching the shift direction of said bidirectional shift register according to a shift direction control signal, said feedback circuit comprising:

a parity check circuit for checking that the number of true bits of a plurality of bits forming given data is even or odd and for controlling a value of a signal output to said right and left shift input terminals according to a result of check; and a selecting circuit for selecting first output data including outputs sent from a first group of output terminals of said N output terminals of said bidirectional shift register or second output data including outputs sent from a second group of output terminals of said N output terminals according to said shift direction control signal, and for sending selected data to said parity check circuit, wherein if a shared output terminal which is shared by said first and second groups of output terminals is present, an output of said shared output terminal is caused to pass through said selecting circuit and is directly sent to said parity check circuit.

3. A pseudo-random number generating circuit comprising:

a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series; and a feedback circuit for feeding back data according to signals output from said N output terminals of said bidirectional shift register to said right and left shift input terminals, wherein pseudo-random number sequences in which $2^N$ kinds of data each once appear in predetermined order can be output from said N output terminals of said bidirectional shift register, and normal or reverse order can be selected as said predetermined order by switching the shift direction of said bidirectional shift register according to a shift direction control signal, said feedback circuit comprising:

a parity check circuit for checking that the number of true bits of a plurality of bits forming given data is even or odd and for directly outputting a signal corresponding to a result of check to said right and left shift input terminals;

a first selecting circuit for selecting either of the rightmost and leftmost output terminals of said N output terminals of said bidirectional shift register according to said shift direction control signal;

a NOR circuit for sending, to said parity check circuit, NOR of data output from all output terminals of said bidirectional shift register except for said rightmost and leftmost output terminals of said N output terminals of said bidirectional shift register and data output from said first selecting circuit; and a second selecting circuit for selecting first output data output from a first group of output terminals of said N output terminals of said bidirectional shift register or second output data output from a second group of output terminals of said N output terminals according to said shift direction control signal, and for sending selected data to said parity check circuit.

4. The pseudo-random number generating circuit as defined in claim 3, wherein said first group of output terminals of said bidirectional shift register includes the rightmost output terminal of said N output terminals, said second group of output terminals of said bidirectional shift register includes the leftmost output terminal of said N output terminals, and data sent to said parity check circuit is output from only said bidirectional shift register and said NOR circuit.

5. A pseudo-random number generating circuit comprising:

a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series; and a feedback circuit for feeding back data corresponding to signals output from said N output terminals of said bidirectional shift register to said right and left shift input terminals, wherein pseudo-random number sequences in which $2^N$ kinds of data each once appear in predetermined order can be output from said N output terminals of said bidirectional shift register, and normal or reverse order can be selected as said predetermined order by switching the shift direction of said bidirectional shift register according to a shift direction control signal, said feedback circuit comprising:
- a parity check circuit for checking that the number of true bits of a plurality of bits forming given data is even or odd and for controlling a value of a signal output to said right and left shift input terminals according to a result of detection; and
- a selecting circuit for selecting first output data output from a first group of output terminals of said N output terminals of said bidirectional shift register or second output data output from a second group of output terminals of said N output terminals according to said shift direction control signal, and for sending selected data to said parity check circuit, wherein said first group of output terminals of said bidirectional shift register includes the rightmost output terminal of said N output terminals, said second group of output terminals of said bidirectional shift register includes the leftmost output terminal of said N output terminals, and data sent to said parity check circuit is output from only said bidirectional shift register.

6. The pseudo-random number generating circuit as defined in claim 5, further comprising:
- a first exclusive-OR circuit having an output terminal connected to said right shift input terminal, and first and second input terminals;
- a second exclusive-OR circuit having an output terminal connected to said left shift input terminal, and first and second input terminals;
- a first NOR circuit for outputting NOR of data output from all output terminals of said bidirectional shift register except for the rightmost output terminal of said N output terminals of said bidirectional shift register to said first input terminal of said first exclusive-OR circuit; and
- a second NOR circuit for outputting NOR of data output from all output terminals of said bidirectional shift register except for the leftmost output terminal of said N output terminals of said bidirectional shift register to said first input terminal of said second exclusive-OR circuit, wherein said parity check circuit directly outputs a signal based on a result of check to said second input terminals of said first and second exclusive-OR circuits.

7. A pseudo-random number generating circuit comprising:
- a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series; and
- a feedback circuit for feeding back data corresponding to signals output from said N output terminals of said bidirectional shift register to said right and left shift input terminals, wherein pseudo-random number sequences in which pseudo-random numbers appear in predetermined order can be output from said N output terminals of said bidirectional shift register, and normal or reverse order can be selected as said predetermined order by switching the shift direction of said bidirectional shift register according to a shift direction control signal, said feedback circuit comprising:
- a parity check circuit for checking that the number of true bits of a plurality of bits forming given data is even or odd and for controlling a value of a signal output to said right and left shift input terminals according to a result of check; and
- a selecting circuit for selecting first output data output from a first group of output terminals of said N output terminals of said bidirectional shift register or second output data output from a second group of output terminals of said N output terminals according to said shift direction control signal, and for sending selected data to said parity check circuit, wherein said first group of output terminals of said bidirectional shift register includes the rightmost output terminal of said N output terminals, said second group of output terminals of said bidirectional shift register includes the leftmost output terminal of said N output terminals, and data sent to said parity check circuit is output from only said bidirectional shift register, and wherein said parity check circuit directly outputs a signal based on a result of check to said right and left shift input terminals.

8. A pseudo-random number generating circuit comprising:
- a bidirectional shift register having a left shift input terminal which is used during left shift from a low order bit to a high order bit and a right shift input terminal which is used during right shift from the high order bit to the low order bit so as to input N-bit data in series while moving the N-bit data right or left, and N output terminals for outputting, in parallel, the data which is input in series; and
- a feedback circuit for feeding back data according to signals output from said N output terminals of said bidirectional shift register to said right and left shift input terminals, wherein pseudo-random number sequences in which $2^N$ kinds of data each once appear in predetermined order can be output from said N output terminals of said bidirectional shift register, and normal or reverse order can be selected as said predetermined order by switching the shift direction of said bidirectional shift register according to a shift direction control signal, and wherein said feedback circuit and said bidirectional shift register include a common selector for selecting at least two outputs of said N output terminals.

9. A bidirectional shift register comprising:
right and left shift input terminals for inputting data in series while shifting data right or left; and
a plurality of output terminals for outputting input data in parallel,
said bidirectional shift register having a data holding function for holding said input data without shift, further comprising;
- path switching means for changing a connection between internal paths in order to switch right shift mode, left shift mode and data holding mode,
- wherein said path switching means includes at least one adjacent output switching means for switching data output from adjacent output terminals of said plurality of output terminals.

10. The bidirectional shift register as defined in claim 9, further comprising at least one data holding means for outputting data to either of said adjacent output terminals which are switched by said at least one adjacent output switching means, said path switching means further comprising:
at least one intermediate switch means provided between said at least one data holding means and said at least one adjacent output switching means for selectively outputting, to said at least one data holding means, either of data output from a predetermined output terminal of said plurality of output terminals other than said adjacent output terminals which are switched by said at least one adjacent output switching means and data output from said at least one adjacent output switching means.

11. The bidirectional shift register as defined in claim 10, wherein said at least one adjacent output switching means includes first to third adjacent output switching means, said at least one data holding means includes first to third data holding means provided corresponding to said first to third adjacent output switching means respectively, said at least one intermediate switch means includes first to third intermediate switch means provided corresponding to said first to third data holding means respectively, said first intermediate switch means selectively outputs right shift data to be shifted right or the output data of said first adjacent output switching means to said first data holding means according to a first direction signal, said first adjacent output switching means selectively outputs output data of said first data holding means or that of said second data holding means according to a second direction signal, said second intermediate switch means selectively outputs output data of said first data holding means or output data of said second adjacent output switching means to said second data holding means according to said first direction signal, said second adjacent output switching means selectively outputs output data of said second data holding means or output data of said third data holding means according to said second direction signal, said third intermediate switch means selectively outputs output data of said second data holding means or output data of said third adjacent output switching means to said third data holding means according to said first direction signal, and said third adjacent output switching means selectively outputs output data of said third data holding means or left shift data to be shifted left according to said second direction signal.

12. The bidirectional shift register as defined in claim 9, further comprising:

canceling means for performing nullification in such a manner that data received at said right or left shift input terminal is not transmitted through said internal path, and transmitting means for transmitting scan data into said internal path.

13. The bidirectional shift register as defined in claim 12, wherein either of said adjacent output terminals switched by said at least one adjacent output switching means includes the most end output terminal of said plurality of output terminals, further comprising:

at least one data holding means for outputting data to said most end output terminal, said path switching means comprising:
at least one intermediate switch means provided between said at least one data holding means and said at least one adjacent output switching means for selectively outputting data received by said right or left shift input terminal which is closer to said most end output terminal, or output data of said at least one adjacent output switching means; and scan switch means, which functions as said canceling means and said transmitting means, provided between said intermediate switch means and said at least one data holding means for selectively outputting scan data or the output data of said at least one intermediate switch means according to a scan control signal.

14. The bidirectional shift register as defined in claim 12, wherein said scan switch means which functions as said canceling means and said transmitting means is provided immediately after said right or left shift input terminal.

* * * * *